United States Patent
Wang et al.

(10) Patent No.: US 9,419,854 B1
(45) Date of Patent: Aug. 16, 2016

(54) METHODS AND SYSTEMS FOR SHARED AWARENESS THROUGH LOCAL OBSERVATIONS AND GLOBAL STATE CONSISTENCY IN DISTRIBUTED AND DECENTRALIZED SYSTEMS

(71) Applicant: The Boeing Company, Chicago, IL (US)

(72) Inventors: Guijun Wang, Issaquah, WA (US); Haiqin Wang, Redmond, WA (US); Changzhou Wang, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 316 days.

(21) Appl. No.: 13/928,588

(22) Filed: Jun. 27, 2013

(51) Int. Cl.
*G06F 15/173* (2006.01)
*H04L 12/24* (2006.01)

(52) U.S. Cl.
CPC ...................................... *H04L 41/00* (2013.01)

(58) Field of Classification Search
None
See application file for complete search history.

(56) References Cited

U.S. PATENT DOCUMENTS

| | | | | |
|---|---|---|---|---|
| 4,800,488 A * | 1/1989 | Agrawal | ................. | H04L 29/00 709/203 |
| 5,987,376 A * | 11/1999 | Olson | ..................... | H04L 29/06 709/201 |
| 6,058,416 A * | 5/2000 | Mukherjee et al. | ........... | 709/203 |
| 7,788,233 B1 * | 8/2010 | Iyer | ................... | G06F 17/30339 707/661 |
| 2003/0009511 A1 * | 1/2003 | Giotta | ....................... | G06F 9/54 709/201 |
| 2003/0055892 A1 * | 3/2003 | Huitema | ................. | H04L 29/06 709/204 |
| 2003/0055898 A1 * | 3/2003 | Yeager | .................... | G06F 9/544 709/205 |
| 2006/0069912 A1 * | 3/2006 | Zheng | ................. | H04L 63/0823 713/151 |
| 2009/0262741 A1 * | 10/2009 | Jungck et al. | ................. | 370/392 |
| 2009/0313350 A1 * | 12/2009 | Hundscheidt et al. | ........ | 709/217 |
| 2012/0303725 A1 * | 11/2012 | Sato | ........................ | H05L 51/14 709/206 |

OTHER PUBLICATIONS

[Choi, 2009] Han-Lim Choi, Luc Brunet, Jonathan P. How, "Consensus-Based Decentralized Auctions for Robust Task Allocation", IEEE Transactions on Robotics, vol. 25, No. 4, Aug. 2009.
[Choi, 2010] Han-Lim Choi, Andrew K. Whitten, Jonathan P. How, "Decentralized Task Allocation for Heterogeneous Teams with Cooperation Constraints", 2010 American Control Conference, Baltimore, MD, USA, Jun. 30-Jul. 2, 2010.
[Whitten, 2011] Andrew K. Whitten, Han-Lim Choi, Luc Brunet, Jonathan P. How, "Decentralized Task Allocation for with Coupled Constraints in Complex Missions", 2011 American Control Conference, San Francisco, CA, USA, Jun. 29-Jul. 1, 2011.

(Continued)

*Primary Examiner* — Umar Cheema
*Assistant Examiner* — John Fan
(74) *Attorney, Agent, or Firm* — McDonnell Boehnen Hulbert & Berghoff LLP

(57) ABSTRACT

Methods and systems for information state sharing and consistency maintenance in a distributed and decentralized network are presented. At a first node of a network, a first information state message (ISM) in a hypothesis phase is generated. The first ISM is propagated to at least one node of a spanning tree of the network, the spanning tree having a root at the first node. A verification opinion is received from the at least one node indicating if a state in the first ISM is verified by the at least one node. A consensus regarding the state in the first ISM is determined based on the verification opinion from the at least one node. A second ISM indicating a confirmed phase is propagated to the spanning tree if the consensus on the state of the ISM is reached.

30 Claims, 22 Drawing Sheets

(56) References Cited

OTHER PUBLICATIONS

[Dionne, 2007] Dany Dionne, Camille A. Rabbath, "Multi-UAV Decentralized Task Allocation with Intermittent Communications: the DTC algorithm", 2007 American Control Conference, New York, NY, USA, Jul. 11-13, 2007.

[Cheng, 2008] Peng Cheng, Vijay Kumar, "An Almost Communication-Less Approach to Task Allocation from Multiple Unmanned Aerial Vehicles", 2008 IEEE International Conference on Robotics and Automation, Pasadena, CA, USA, May 19-23, 2008.

[Ahmed, 2011] Shameem Ahmed, Klara Nahrstedt, Guijun Wang, "Topology-Aware Optimal Task Allocation for Mission Critical Environment—A Decentralized Approach", MILCOM 2011, Baltimore, MD, USA, Nov. 7-10, 2011.

[Ahmed, 2009] Shameem Ahmed, Thadpoon Pongthawornkamol, Klara Nahrstedt, Matthew Caesar, Guijun Wang, "Topology-Aware Optimal Task Allocation for Publish/Subscribe-Based Mission Critical Environment", MILCOM 2009, Boston, MA, USA, Oct. 18-21, 2009.

[Ren, 2007] Wei Ren, Randal Beard, Ella Atkins, "Information Consensus in Multivehicle Cooperative Control", IEEE Control Systems Magazine, Apr. 2007.

[Moallemi, 2006] Ciamac Moallemi, Benjamin Van Roy, "Consensus Propagation", IEEE Transactions on Information Theory, vol. 52, No. 11, Nov. 2006.

[Beard, 2003] Randal Beard, Vahram Stepanyan, "Information Consensus in Distributed Multiple Vehicle Coordinated Control", the 42nd IEEE Conference on Decision and Control, Hawaii, USA, Dec. 2003.

[Birman, 2007] Ken Birman, "The Promise and Limitations of Gossip Protocols", ACM SIGOPS Operating Systems Review, vol. 41 Issue 5, Oct. 2007.

[Boyd, 2005] Stephen Boyd, Arpita Ghosh, Balaji Prabhakar, Devavrat Shah, "Gossip Algorithms: Design, Analysis and Applications", 24th Annual Joint Conference of the IEEE Computer and Communications Societies, 2005, pp. 1653-1664.

[Boyd, 2006] Stephen Boyd, Arpita Ghosh, Balaji Prabhakar, Devavrat Shah, "Randomized Gossip Algorithms", IEEE Transactions on Information Theory, vol. 52, No. 6, Jun. 2006.

[Asensio-Marco, 2010] Cesar Asensio-Marco, Baltasar Beferull-Lozano, "Accelerating Consensus Gossip Algorithms: Sparsifying Networks Can Be Good for You", 2010 IEEE International Conference on Communications (ICC), 2010, pp. 1-5.

[Dimakis, 2008] Alexandros G. Dimakis, Anand D. Sarwate, Martin J. Wainwright, "Geographic Gossip: Efficient Averaging for Sensor Networks", IEEE Transactions on Signal Processing, vol. 56, Issue: 3, 2008, pp. 1205-1216.

[Doerr, 2012] Benjamin Doerr, Mahmoud Fouz, Tobias Friedrich, "Why Rumors Spread So Quickly in Social Networks", Communications of the ACM, vol. 55, No. 6, Jun. 2012, pp. 70-75.

[Demers, 1987] Alan Demers, Dan Greene, Carl Hauser, Wes Irish, John Larson, "Epidemic Algorithms for Replicated Database Maintenance", Proceedings of the Sixth Annual ACM Symposium on Principles Distributed Computing, 1987, pp. 1-12.

[Wang, 2006] H. Wang, G. Wang, A. Chen, C. Wang, C. Fung, S. Uczekaj, R. Santiago, "Modeling Bayesian Networks for Autonomous Diagnosis of Web Services" in the 19th International FLAIRS Conference, Melbourne, FL, USA, May 11-13, 2006.

[OSPF, 1991] Open Shortest Path First (OSPF) Routing Protocol, http://www.rfc-editor.org/rfc/rfc1247.pdf.

* cited by examiner

METHODS AND SYSTEMS FOR SHARED AWARENESS THROUGH LOCAL OBSERVATIONS AND GLOBAL STATE CONSISTENCY IN DISTRIBUTED AND DECENTRALIZED SYSTEMS

FIELD

Embodiments of the present disclosure relate generally to distributed and decentralized systems collaboratively achieving common mission objectives. More particularly, embodiments of the present disclosure relate to coordination of network nodes for shared awareness and global consistency in distributed and decentralized systems.

BACKGROUND

Existing methods for coordination of network nodes assume perfect network connectivity, assume any locally observed information state of a subject is the true state of the subject, and use a non-deterministic number of iterations of information exchange between neighboring nodes, and are uncertain in state convergence.

SUMMARY

Methods and systems for information state sharing and consistency maintenance in a distributed and decentralized network are presented. At a first node of a network, a first information state message (ISM) in a hypothesis phase is generated. The first ISM is propagated to at least one node of a spanning tree of the network, the spanning tree having a root at the first node. A verification opinion is received from the at least one node indicating if a state in the first ISM is verified by the at least one node. A consensus regarding the state in the first ISM is determined based on the verification opinion from the at least one node. A second ISM indicating a confirmed phase is propagated to the spanning tree if the consensus on the state of the ISM is reached.

In this manner, embodiments of the disclosure provide scalable, high performance, and fault-tolerant methods for achieving shared awareness through local observations and global state consistency in distributed and decentralized systems.

In an embodiment, a method for information state sharing and consistency maintenance in a distributed and decentralized network generates at a first node of a network a first information state message (ISM) in a hypothesis phase. The method also propagates the first ISM to at least one node of a spanning tree of the network, the spanning tree having a root at the first node. The method further receives a verification opinion from the at least one node indicating if a state in the first ISM is verified by the at least one node. The method further determines a consensus regarding the state in the first ISM based on the verification opinion from the at least one node. The method further modifies the first ISM to a confirmed phase and propagates a second ISM indicating the confirmed phase to at least one node of the spanning tree of the network if the consensus on the state of the first ISM is reached.

In another embodiment, a system for information sharing and consistency maintenance between nodes in a network comprises a message generation module, a propagation module, a state verification module, a consensus determination module, and a message generation module. The message generation module generates at a first node of a network a first information state message (ISM) in a hypothesis phase. The propagation module propagates the first ISM to at least one node of a spanning tree of the network, the spanning tree having a root at the first node. The state verification module provides a verification opinion by the at least one node indicating if local evidence contradicts with a state in the first ISM. The consensus determination module determines a consensus regarding the ISM based on the verification opinion from the at least one node. The message generation module modifies the first ISM to a confirmed phase and propagates a second ISM indicating the confirmed phase to at least one node of the spanning tree of the network if the consensus on the state of the first ISM is reached.

In a further embodiment, a non-transitory computer readable storage medium comprises computer-executable instructions for message state consistency maintenance in a distributed and decentralized network. The computer-executable instructions generate at a first node of a network a first information state message (ISM) in a hypothesis phase, and propagate the first ISM to at least one node of a spanning tree of the network, the spanning tree having a root at the first node. The computer-executable instructions also receive a verification opinion from the at least one node indicating if a state in the first ISM is verified by the at least one node, and determine a consensus regarding the state in the first ISM based on the verification opinion from the at least one node. The computer-executable instructions modify the first ISM to a confirmed phase and propagate a second ISM indicating the confirmed phase to at least one node of the spanning tree of the network if the consensus on the state of the first ISM is reached.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to communication networks, open eco-systems, mathematical modeling, simulation, and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, an ad-hoc network. Embodiments of the disclosure, however, are not limited to such ad-hoc network applications, and the techniques described herein may also be utilized in other applications. For example but without limitation, embodiments may be applicable to intranets, central networks, sensor networks, or other network application.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
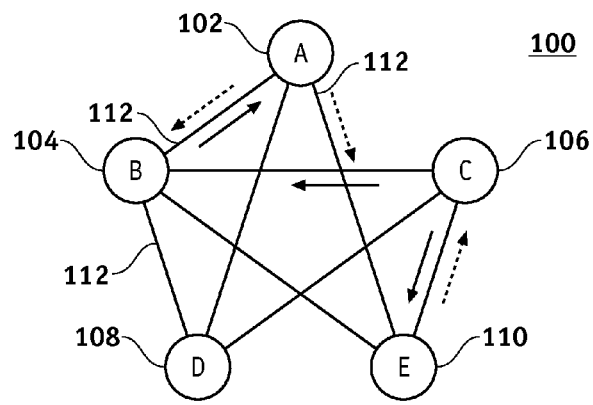
FIG. 1 is an illustration of an exemplary node network showing agent nodes according to an embodiment of the disclosure.

FIG. 1 is an illustration of an exemplary network node graph 100 showing agent nodes A102-E110 (nodes A102-E110). A distributed and decentralized system comprises distributed, self-directed, and self-managed subsystems working together collaboratively. The subsystems may be autonomous agents/platforms and computing services. In abstraction, these subsystems are nodes and their communication links are edges of a network. The mission coordination is to enable multiple distributed and decentralized nodes to have shared awareness of information state, determine task allocation, perform the tasks, monitor mission progress, and achieve mission objectives. Achieving shared awareness and global consistency among distributed and decentralized nodes is an important issue in mission coordination. An information state is a representation of an attribute and its value of a subject, e.g., a temperature attribute and its value (e.g., 85 degrees) of an area, a health attribute and its value (e.g., up or down) of a network node. Shared awareness means information state detected by one node is shared with other nodes, which may not have an ability to detect the information state directly. Global consistency means an information state is the same across all nodes.

A distributed and decentralized system comprises distributed, self-directed, and self-managed nodes that form a logical network overlaid onto a communication network and work collaboratively to achieve common mission objectives. Such a logical network of a distributed and decentralized system is referred to herein as an agent network, where each agent comprises a generalized functionality representing physical entities like an autonomous system, a computing service, and a computing and communication device. An agent network is further represented as a graph as discussed below.

A distributed and decentralized system may be represented as a graph of nodes A102-E110 and edges 112. A node from the nodes A102-E110 may be, for example but without limitation, a software agent such as: a monitoring agent, a target recognition agent, or a shopping service agent, a platform such as: an unmanned aerial vehicle (UAV), a robot, or a car, or other software, device, computing service, or platform agent. The edge 112 is a direct network connection between two nodes from the nodes A102-E110. For simplicity, a bidirectional network connection is described herein (i.e., if A is connected to B, B is also connected to A). Nodes A and B such as the nodes A102 and B104 are neighbors if there exists an edge such as the edge 112 (i.e., network connection) between them. A connected graph may be traversed from a single node via a spanning tree (FIG. 5), which is a tree comprising all the nodes and some edges in the graph. A graph is partitioned if it comprises two or more sub-graphs that have no edge between them. A graph may dynamically change in topology when nodes join/leave/move and edges are added or removed as nodes are connected or disconnected.

Common approaches of mission coordination may be generally classified in two categories: centralized approaches based on a central authority and decentralized approaches without a central authority.

In a centralized approach, a node acts as a central authority, receives input from other nodes, makes decisions, and notifies other nodes on the decisions. This centralized approach is common in enterprise systems. For example, a centralized diagnostic service taking input from distributed monitors. A centralized approach is simple to coordinate, but has several drawbacks including a single point of failure, low scalability, and slow decision making.

In a decentralized coordination approach, states are observed and maintained by local nodes. As mentioned above, an information state is a representation of an attribute and its value of a subject, e.g., the temperature attribute and its value (e.g., 85 degrees) of an area, the health attribute and its value (e.g., up or down) of a network node.) Local nodes take initiatives and make decisions based on local states. Some or all of one node's local states may be inconsistent with the corresponding states in another node. For example, a node X has locally observed that a subject node N is down, while another node Y still has a good connection with the subject node N (and thus has N's health state as up). It is thus important to define protocols and algorithms to share and reach consistent states among the nodes in order to make globally non-conflicting decisions. The network may be dynamic with nodes joining/leaving and edges connecting/disconnecting. Nodes and edges may also suffer faults (i.e., node failures and communication losses) that may result in state inconsistency and network partitions.

A distributed and decentralized system comprises distributed, self-directed, and self-managed subsystems working together collaboratively. The subsystems are connected via a communication network 202 (FIG. 2) to form a logical overlay network. The subsystems may be distributed across a wide area. The communication network 202 may be a relative stable enterprise network or a fragile tactical wireless network under dynamic and adverse operational conditions. In the overlay network, each subsystem may be considered as a node from the nodes A102-E110 (FIG. 1), each communication link between two nodes such as the nodes A102/B104 may be considered as an edge such as the edge 112, and together a distributed and decentralized system may be considered as a graph of nodes and edges (FIG. 1). Two nodes A102 and B104 connected by the edge 112 are considered as a pair of neighboring nodes who may send/receive messages directly between each other.

A distributed and decentralized system may comprise three characteristics: any nodes from the nodes A102-E110 may take autonomous actions; none of nodes from the nodes A102-E110 acts as a central authority for the system; and the nodes A102-E110 are distributed in different locations and connected through the communication network 202. As explained above, in concrete computing systems, a node of the nodes A102-E110 may be a software agent (e.g., target recognition), a device (e.g., a smart phone), a platform (e.g., airplane), or a computerized service (e.g., banking service). The edge 112 may be, for example but without limitation, a physical wired connection, a wireless connection, a logical communication channel, or other communication means.

In a distributed and decentralized system, there is no single node of the nodes A102-E110 as the central authority to manage all other nodes of the nodes A102-E110. A state of such a system is the collection of the values of certain attributes stored in and understood by the distributed nodes. Such attributes comprise, for example but without limitation, business logic attributes (e.g., sensor temperature, bank balance, and inventory level), system health attributes (e.g., whether a particular node is fast or slow, connected or disconnected, operational or non-operational), or other attribute. It is possible that a value of an attribute stored in one node of the nodes A102-E110 is different from the value of the same attribute stored in another node of the nodes A102-E110. Such type of differences is often referred to as state inconsistency. The attributes and their values may be encapsulated in an information state message (ISM) 204 (FIG. 2) that may be communicated directly between neighboring nodes of the nodes such as the nodes A102 and B104. Such communications may be viewed as a process of propagations in order to reach many nodes C106 of the nodes A102-E110 in the network node graph 100 beyond immediate neighbors A102/B104.

For example, in a system of multiple autonomous robots, the robots are given a mission to work collaboratively to survey a large geographical area. Each task in the mission may be allocated to one of the robots in a decentralized manner without a central authority. The allocation may be globally conflict-free. Due to limited wireless communication range, any two robots are directly connected only when they are within the range. Two directly connected robots are called neighbors in the network. However, general communication between two robots may be routed through neighbor-to-neighbor connections. In such a system, each robot maintains a local state including its perception of its neighbors. The system is dynamic due to movements of the robots and potential failures in robots and their communications. A scalable, high performance and fault-tolerant approach is needed to achieve shared awareness and reach globally consistent decisions among the robots.

For another example, in a system of global data services, interconnected subsystems are deployed around the globe. Clients may utilize the services of the system from anywhere via Internet access. The health states of the subsystems and their communications may change dynamically. Due to its large scale, the system may be partitioned into isolated islands of subsystems from time to time. The design of the system must be resilient to faults and avoid interruptions as much as possible. A scalable, high performance and fault-tolerant approach is needed to achieve shared awareness and ensure global data consistency among the subsystems.

For another example, in a social network, an individual may dynamically join or leave the social network. The status of an individual may change, e.g., from online to offline. An individual may disconnect from another individual and connect with a new individual at any time. Many individuals may publish information to the social network at any given time. A scalable, high performance and fault-tolerant approach is needed to facilitate information sharing and group problem solving for the social network.

For another example, in a system of decentralized onboard health monitoring agents in an airplane, each agent monitors an important component of the airplane. Because of the interdependencies among the components, many agents have awareness of the states in other agents. Thus, important states such as system conditions and important events should be propagated across the agents efficiently. A scalable, high performance and fault-tolerant approach is needed to facilitate information sharing and system diagnostics and prognosis among the agents.

For another example, in a system of distributed autonomous collaborative airplanes, the airplanes are given a mission which consists of a set of interdependent tasks. The airplanes work collaboratively in deciding task allocations and exchanging information. Airplanes may fly away and their communications may fail. The airplane network may be partitioned into multiple isolated islands due to communication limitations or failures. Task allocations are needed to respond to dynamic situations in the airplane network including changes in airplane workloads and network health conditions. A scalable, high performance and fault-tolerant approach is needed to achieve shared awareness and ensure mission progress under dynamic and adverse conditions for the network of airplanes.

A central challenge of distributed and decentralized systems is to design protocols and algorithms for achieving shared awareness and reaching globally consistent consensus on states among the nodes A102-E110. The challenge is due to the lack of any central authority that collects, validates, and aggregates states from distributed nodes and disseminates states to those nodes. Each node such as the node A102 of the nodes A102-E110 has local knowledge of the state of its neighborhood such as the node B104 and acts based on the local knowledge. Different nodes such as the nodes C108-E110 might have inconsistent view of the state of the system. Such inconsistency could lead to conflicting decisions made by different nodes of the nodes A102-E110. Furthermore, faults on nodes A102-E110 and their communications could also lead to inconsistent views of the same state of a subject 214 (FIG. 2) across nodes the A102-E110. A scalable, high performance, and fault-tolerant information state message (ISM) propagation and synchronization solution achieves shared awareness and reach global consistency among decentralized nodes A102-E110 based on local knowledge and initiatives.

Embodiments provide shared awareness and reach global consistency by having the nodes A102-E110 communicate their states with each other. In this manner, the embodiments also provide the following solutions:

Leverage decentralized perceived states based on local observations and notify all nodes A102-E110 on the state changes as quickly as possible.

Reconcile the potential conflicts between a locally perceived state of the subject 214 and the subject 214 true state due to limitations of local knowledge.

Minimize communication overheads.

Maximize efficiency when communications are needed.

Verify the information state in an ISM received using local knowledge and provide a response to a sender of the ISM, especially when the verification results in a negative confirmation.

Recognize and eliminate redundant ISM instances initiated concurrently by autonomous decentralized the nodes A102-E110.

Handle transient and potentially inconsistent state while the nodes A102-E110 are in the process of converging on a consistent state.

Recognize and handle faults in the nodes A102-E110 and their communications.

Recognize and handle network partitioning, i.e., a network of nodes is partitioned into multiple islands of communities due to network failures or topology changes (e.g., caused by mobility).

Recover from partitioning when two or more partitions rejoin.

Embodiments comprises a suite of scalable, high performance, and fault-tolerant state propagation and synchronization protocols and algorithms designed to address the aforementioned issues for robust mission executions in distributed and decentralized systems.

Using a system of distributed autonomous collaborative agents/platforms (e.g., software agent or UAV platforms) as an example, these agents/platforms use a decentralized task allocation (DTA) algorithm to decide which agents/platforms to perform which tasks in a mission-critical system. DTA allows each agent/platform to make self-directed determination of eligibility for carrying on a task and, if eligible, submit a bid to a decider agent/platform. DTA depends on a robust, fault-tolerant approach to identify a globally unique decider by the decentralized, self-directed agents/platforms. Such a globally unique decider is required so that it may collect the bids from the agents/platforms, determine the best-fit agent/platform that may perform a task, and inform the bidding agents/platforms on the winning bidder for performing the task.

A theoretically perfect and static system of networked agents/platforms would assume that failures in agents/platforms or their communications never occur, network is never partitioned, and every agent/platform is known ahead of time and always available in perfect health conditions. However, in practice, a distributed and decentralized system needs to handle failures at network, application, and agent/platform layers. Agents/platforms in such a system may dynamically come and go, become up and down, or be added and removed. Embodiments provide a fault-tolerant state propagation and synchronization approach to efficiently achieve shared awareness and reach globally consistent states, which is essential to local decision makings such as those based on a DTA algorithm in distributed and decentralized systems.

Figure 2:
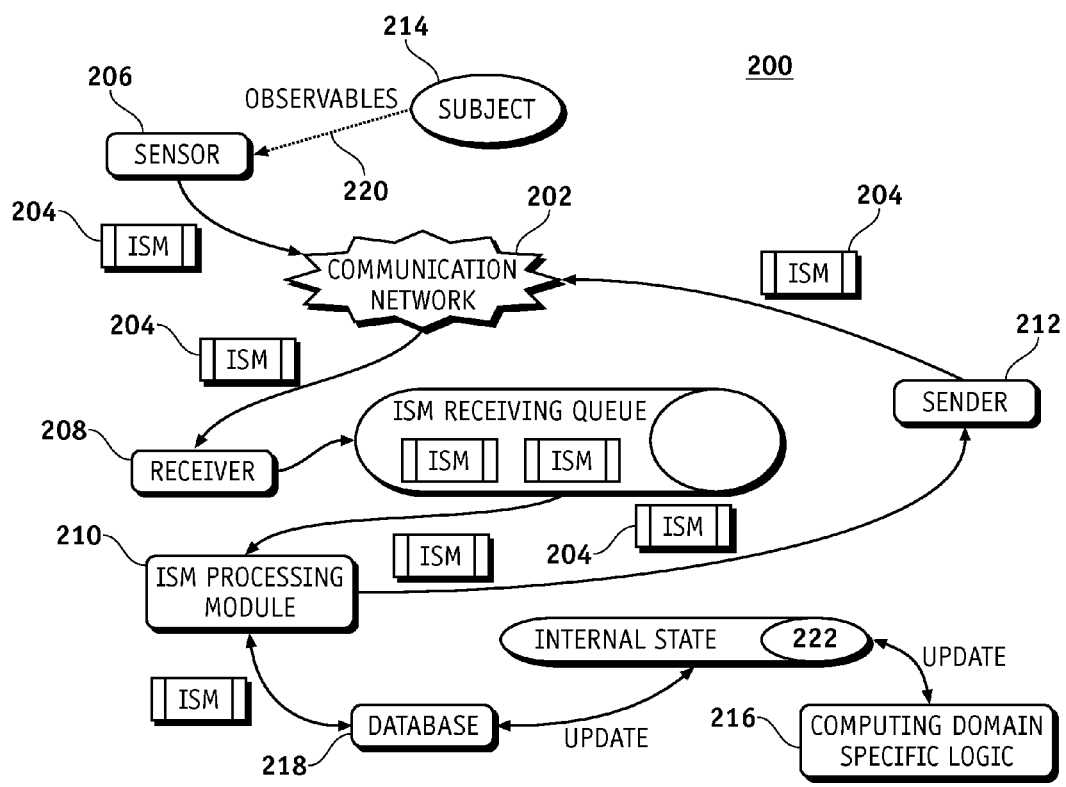
FIG. 2 is an illustration of an exemplary set of functions of an agent node forming the nodes of FIG. 1 as concurrent activities supporting an Information State Message (ISM) propagation protocol for shared awareness according to an embodiment of the disclosure.

FIG. 2 is an illustration of an exemplary set of functions of an agent node 200 forming the nodes A102-E110 of FIG. 1 as concurrent activities supporting an Information State Message (ISM) propagation protocol for shared awareness according to an embodiment of the disclosure. An ISM is a message encapsulating the information state that is being propagated among the network nodes.

In this embodiment, each node is an agent represents a software agent like a target recognition service or a platform like a UAV. Each agent comprises multiple threads running concurrently performing sensing by a sensor 206, receiving by a receiver 208, processing by an ISM processing module 210, sending by a sender 212, computing domain specific logic by a computing domain specific logic 216, and maintaining internal states records by a database 218.

The sensor 206 detects changes in external or internal state of a subject 214 (e.g., a neighboring node) and generates the information state message (ISM) 204 encapsulating the information state for propagation. The detection may be through, for example but without limitation, probing, or other method.

Figure 4:
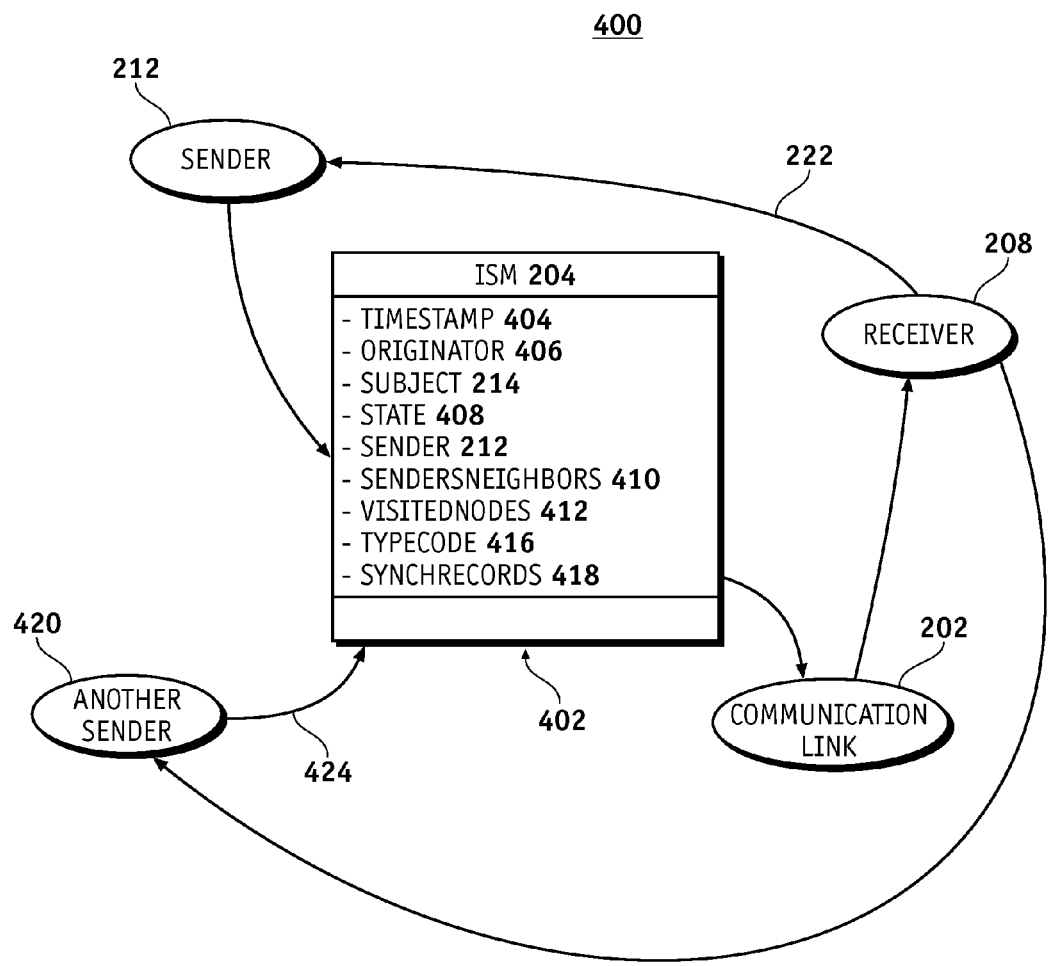
FIG. 4 is an illustration of an exemplary attributes of an Information State Message (ISM) according to an embodiment of the disclosure.

The receiver 208 receives the ISM 204 from neighboring nodes of the nodes A102-E110 via the communication network 202. Upon receiving, the receiver 208 determines actions based on the ISM 204 values in its originator 406, sender 410, and typeCode 416 attributes (FIG. 4).

The ISM processing module 210 removes duplicate, verifies the information state in a received ISM and determines the next step in handling the ISM 204. The ISM processing module 210 further, determines whether a received ISM 204 is a duplicate. Verifying the state in a receiving ISM 204 may be based on local knowledge. The next step is dependent on the verification result. If the ISM processing module 210 has evidence in its local knowledge to correct the state in the ISM 204 (i.e., verification result is negative), it echoes back a correction to the sender 212. If not, the ISM processing module 210 continues to propagate the ISM 204 to unvisited neighbors. If there are no more unvisited neighbors (i.e., it is the leaf node), the ISM processing module 210 may echo back an acknowledgment to its sender 212.

The sender 212 propagates the ISM 204 to neighboring nodes.

The computing domain specific logic module 216 executes domain specific logic processing in an internal state 222, e.g., executes an algorithm to recognize targets in a picture or video.

The database 218 maintains the internal state 222 records. Records may be updated upon the internal state 222 change or receiving a state change in the ISM 204 from a neighbor.

Figure 3:
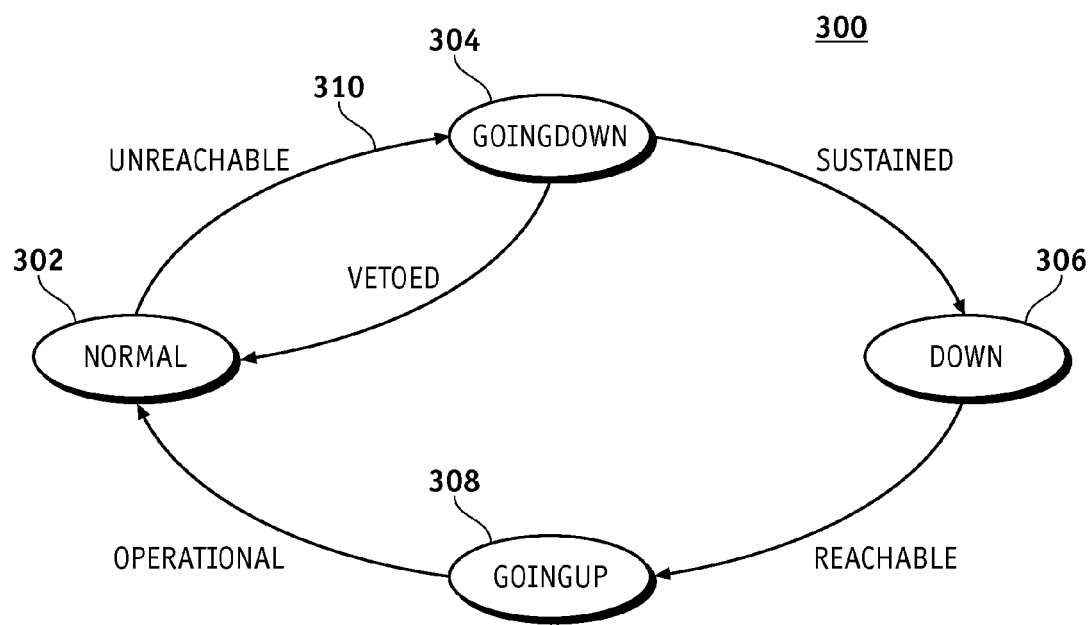
FIG. 3 is an illustration of a state transition diagram showing an exemplary utilization of transient states between true states according to an embodiment of the disclosure.

FIG. 3 is an illustration of a state transition diagram 300 showing an exemplary utilization of transient states between true states according to an embodiment of the disclosure. An external observable state of a node from the nodes 102A-110E is used as an example of information state that needs propagation and consensus. The values of the state comprise {NORMAL 302, GOINGDOWN 304, DOWN 306, GOINGUP 308} where {GOINGDOWN 304, DOWN 306} and {GOINGUP 308, NORMAL 302} are an implementation of a 2-value state mechanism to handle a transient state.

The state of the subject 214 (FIG. 2) has a set of true values—those that represent the true state of the subject 214. For example, a node's true state may be down 306 (i.e., not working) or normal 302 (i.e., working) and nothing in between. However, the true state of the subject 214 may not be known by an outside observer. The observer may have limited local knowledge about the subject and thus its observation may be biased or incomplete. A two-value state mechanism is used herein to represent a potential transition from a transient-value to a true value as: <transient-value, true-value>. A transient value is used when the true value is uncertain and subject to verification. A true value is used when it is confirmed by consensus of all nodes in a system.

In the example shown in FIG. 3, the values of the state of a node are {NORMAL 302-, GOINGDOWN 304, DOWN 306, GOINGUP 308} where <GOINGDOWN, DOWN> and <GOINGUP, NORMAL> are an implementation of the 2-value state mechanism to handle transient state. The values of "GOINGDOWN" 304 and "GOINGUP" 308 are transient state to true state values of "NORMAL" 302 and "DOWN" 306. For example, when a node is detected as "Unreachable" 310, its state is transitioned from "NORMAL" 302 to "GOINGDOWN" 304. After the state is confirmed by consensus, its state is transitioned from "GOINGDOWN" 304 to "DOWN" 306; or if the "GOINGDOWN" 304 state is vetoed by another node, its state is transitioned from "GOINGDOWN" 304 back to "NORMAL" 302.

This two-value state mechanism is used together with a two-phase hypothesis/confirmation procedure of the transient state handling module 608 of system 600 (FIG. 6) to support a robust solution to overcome the limitation of local knowledge while attempting to reach global consensus to a state. With this mechanism, each receiving node in the system 600 has the shared awareness to take appropriate actions during the uncertain and transient period before the true state value is determined through global consensus or evidence-based correction mechanisms.

A transition of states in an ISM propagation process 700 (FIG. 7) of the ISM propagation module 606 is triggered by events and conditions as explained in more detail below in the context of discussion of FIGS. 6-7 below.

In this document, the term "state" means any observable conditions of a subject such as the subject 214 in FIG. 2. For example, a state may be about an occurrence of an event, a temperature of an area, and health of a network node. The health of a network node, in particular, is used as an example of state to illustrate the embodiments herein. A term "perceived state" means an observation 220 (FIG. 2) of the "state" by a node from the nodes A102-E110 based on a local knowledge. Different nodes from the nodes 102A-110E may have different "perceived state" due to limitations of the local knowledge and as such, a "perceived state" on the subject 214 may be inconsistent with the "true state" of the subject 214. The term "true state" means the real and actual state of the subject 214 (FIG. 2). Global state consistency means each node from the nodes 102A-210E in the network nodes graph 100 has the same understanding of the state of the subject 214 in the network nodes graph 100 (i.e., there is no conflicting view of the state by the distributed nodes 102A-210E).

In addition, the health state of the nodes 102A-110E in the network nodes graph 100 is used as an example to simplify the description and understanding of the procedures and algorithms described herein. However, the procedures and algorithms are applicable to any other types of states in a decentralized system.

FIG. 4 is an illustration of an exemplary attributes 400 of an ISM according to an embodiment of the disclosure.

State is a general term representing domain specific attributes and their types and values of a subject. For example, a temperature (a float type of numeric values) detected by a sensor represents a state of an environment. A response time (a time interval type with a numeric value and a time unit) measured by a monitoring agent is a state of the monitored system. A status (an enumerate type of {NORMAL 302, GOINGDOWN 304, DOWN 306, GOINGUP 308}) of a neighbor node as detected by a network node is a state of the neighbor node. State may be a measure of an external environment (e.g., temperature, location, and connectivity condition) or belief calculated from internal and external input (e.g., average temperature, feeling, attitude and intent). Each node holds local states. A network of nodes such as the network nodes graph 100 is said to have globally consistent states at a given time if all the nodes A102-E110 have identical values for the same state of a subject.

State may be encapsulated as an Information State Message (ISM) such as the ISM 204 (also see FIG. 2) for passing between the nodes. An ISM is a piece of data with bounded size. Because an ISM may be created by a node based on local knowledge, the ISM may be subject to verification and may be corrected by evidence held by other nodes. An ISM is initiated from a node and propagated through neighbor-to-neighbor communications in a network such as the network nodes graph 100.

Embodiments initiate and propagate an ISM for sharing based on events rather than periodically using a fixed time interval. When a node from the nodes A102-E110 detects an event or a condition on a subject of interest, it may initiate/generate the ISM 204 and start to propagate the ISM 204. It is possible that multiple nodes detect the occurrence of the same event. To differentiate and resolve duplicates of the ISM 204 instances for the same event, attributes are associated with each ISM 204 (message 204).

Attributes of an ISM such as the ISM 204 comprise, for example but without limitation, the following:

timestamp 404: the time when the message is created originator 406: the node that created the message subject 214: the subject about which the state is (e.g., a node N)

state 408: the value of the state sender 212: the sender 212 of the message 204, initially it is the originator 406 and then later is the node from which the message is sent in a neighbor to neighbor communication method sendersNeighbors 410: the set of neighbor nodes of the sender 212 visitedNodes 412: the nodes visited by the message 204 typeCode 416: an enumerate value indicating the type of the message. It may comprise one of the following six values: {HYPOTHESIS, CONFIRMED, VETO, ECHO, DUPLICATE, SYNC}. The default value is "HYPOTHESIS".

syncRecords 418: payload of the message used only when the typeCode is SYNC for state synchronization when partitions rejoin The typeCode 416 attribute is used to differentiate different types of messages 204 to facilitate the handling of the messages 204 according to their types. The meaning of the typeCode values are defined as follows:

HYPOTHESIS (opinion): this typeCode indicates the ISM 204 is in a hypothesis phase.

CONFIRMED: this typeCode indicates the ISM 204 is in a confirmed phase.

VETO: this typeCode indicates the ISM 204 is a correction to the corresponding ISM 204 in a hypothesis phase.

ECHO: this typeCode indicates the ISM 204 is an echo from a receiver 208 to the sender 212 regarding the corresponding ISM 204 in a hypothesis phase.

DUPLICATE: this typeCode indicates that the ISM 204 from the sender 212 to the receiver 208 is a duplicate that the receiver 208 has already received from another sender 420. One ISM instance Z is a duplicate of another W when Z is an identical copy of W (i.e., they have the same timestamp, originator, and subject) or Z is about the same subject and state as W (i.e., they are independently observed by two originators). The sender 212 of the message 204 should view an edge to the receiver 208 as non-existent in the propagation spanning tree 504 (FIG. 5) (as if the sender 212 didn't send the message 204 to the receiver 208 in the first place).

SYNC: this typeCode indicates that the ISM 204 contains additional data payloads in the SyncRecords 418 attribute for synchronization.

Examples of events that may trigger the initiation of the ISM 204 may comprise, for example but without limitation, connectivity state changes (e.g., a node N such as the node A 102 is detected to be disconnected or connected by a neighboring node such as the node B 104), monitored value changes (e.g., temperature exceeds a threshold or response time is above a threshold), and calculated belief changes (e.g., a reputation of a subject node is updated), or other event.

Figure 5:
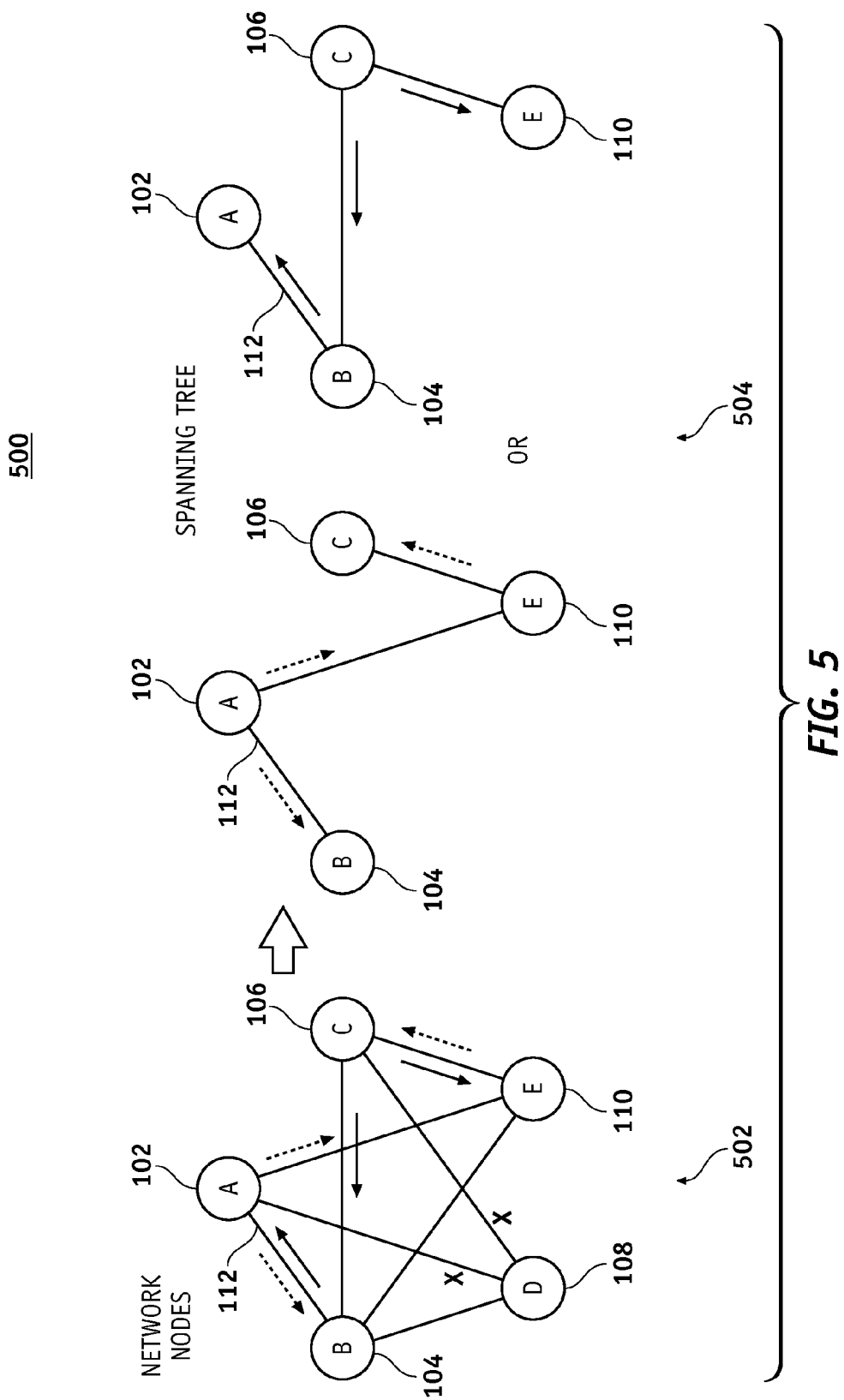
FIG. 5 is an illustration of an exemplary process showing two concurrent instances of detection of state change, initiation and propagation of information state message (ISM) along a dynamically generated spanning tree according to an embodiment of the disclosure.

In one example, as shown in FIG. 5, when node A's 102 neighbor node D 108 is disconnected from the node A 102 and is unreachable from the node A102 any longer, the node D's 108 true state may be one of the following: down 306 (i.e., no longer working), isolated (i.e., working but not reachable by any other nodes due to the node D's 108 communication failure or out of communication range), or normal 302 (i.e., not reachable from the node A 102 but reachable by some other nodes). Under the condition that the node D 108 was the nodes A's 102 neighbor and now became unreachable from the node A 102, the node A 102 generates an ISM such as the ISM 204 about the node D's 108 state as "GOINGDOWN 304" with the typeCode 416 being "HYPOTHESIS" and initiates its propagation. Receiving nodes such as the nodes B 104, C 106, and E 110 (receiver 208) of the ISM 204 may either veto the hypothesis and echo the true state back to the sender 212 or sustain and propagate the ISM 204 to other nodes.

In case that no receiver 208 echoes back a veto, a consensus on an ISM's hypothesis is reached when the ISM 204 has finished traversing the spanning tree 504 of the network 502 and the hypothesis is confirmed as the true state. In case that at least one receiver 208 echoes back a veto, the originator of the ISM 204 will receive the veto along with the true state. In any case, the originator updates the ISM 204 with the true state and propagates it to the nodes in the spanning tree 504 using a CONFIRMED type code 416. In this document, a consensus means that no node in the spanning tree 504 has evidence to contradict the hypothesis (opinion) conveyed in the ISM 204 and thus all nodes agree with the state in the ISM. After consensus is reached, or the originator receives a veto message, the originator sends out the ISM 204 with a CONFIRMED type code 416 so all nodes of the nodes in the spanning tree 504 may be aware of the true state of the subject 214.

Additionally, each node holds a record of state of other nodes in a table data structure. Each row of the table is about one node N and comprises the following attributes:

isNeighbor: true if N is a neighbor; false otherwise.

state: the state of node N. For example, if the state is the health of the node, the state could be one of the four values: NORMAL 302, DOWN 306, GOINGDOWN 304, GOINGUP 308 timestamp: the time when node N's state in this table was last updated message: any ISM received about the state of node N as the subject FIG. 5 is an illustration of an exemplary process showing two concurrent instances of detection of state change, initiation and propagation of information state message (ISM) along a dynamically generated spanning tree 504 in a network node graph 502 (network 502) according to an embodiment of the disclosure.

In a distributed and decentralized system, e.g., an agent network, each node has a perceived state about a subject (e.g., temperature of an area or another node's health state), which may or may not be consistent with the true state of the subject node. Because of the distributed and decentralized nature of such a system, the perceived state has three characteristics: (1) it may be of interest to other nodes and should be shared with them; (2) it may be inconsistent with the true state of the subject node due to limitations of local knowledge and should be verified by other nodes to reach global consensus (and thus converge to true state of the subject node); (3) multiple nodes may concurrently detect a state change of the subject node and initiate multiple duplicating ISM propagations.

In the example shown in FIG. 5, both nodes A 102 and C 106 have been neighbors of node the D 108. When node D 108 is unreachable by A 102 and C 106, they both detect D 108's state change, more or less at the same time, and generate an ISM encapsulating D's 108 state change (going down) respectively, and initiate their own ISM propagation to other nodes in the network. The propagation paths for node A's 102 ISM form a spanning tree rooted at node A 102. Similarly, the propagation path for node C's 106 ISM forms a spanning tree rooted at node C 106. In this example 500, the health state of node D 108 is shared across the network through the ISM propagation. In other examples, a state may be any discrete category or continuous value for various types of subjects such as temperature, throughput, resource, and response time measured or perceived by local nodes.

Careful consideration of the example in FIG. 5, however, reveals some of the important issues to achieve the shared awareness through the propagation. For example, how could the information propagate to other nodes in the system in a scalable way with deterministic performance and high efficiency (i.e., low overhead)? Additionally, when both nodes A 102 and C 106 detect D's 108 state change and initiate propagation of their respective ISM instances about the state, it is understood that one complete propagation, either A's 102 or C's 106, is sufficient and the other is redundant.

Another issue is regarding the perceived state of a subject versus its true state. It is also understood that neither A's 102 ISM nor C's 106 ISM is necessarily the true state of D because of their limitations of local observations and it is quite possible that B 104 may have evidence to show that D is in a perfectly running state. Therefore, the question is how the hypothesis of D's state from A's and C's ISM instances could be verified so that the true state of D could be known to all nodes. More complicated issues concern the faults in the network. For example, some nodes or their communications could fail. How to tell whether an unreachable node is down or is not down but in a separate partition (i.e., all the communication links to reach it have failed)? Clearly there are several challenges to propagation and synchronization protocol and algorithms that are scalable, high performance, and fault-tolerant.

Eliminating the propagation of redundant ISM instances as soon as possible may help reduce overhead in terms of time and resources. Stopping the propagation of an ISM that the state in the ISM is verified negatively and echoing back to the sender the true state could also reduce unnecessary consumption of time and resources. Early detection of network partitions could further speed up consensus time and prepare for synchronization upon partition recovery.

The first challenge is to ensure efficient propagation with a deterministic time bound. Embodiments use event-driven and deterministic propagation along a dynamically formed spanning tree 504. The propagation paths result in the spanning tree 504, which ensures each edge 112 in the spanning tree 504 is visited once and only once in a successful state propagation. Therefore, the total propagation time is deterministically bounded by the number of edges 112 in the spanning tree 504. Propagation is explained in more detail in the context of discussion of ISM propagation module 606 of system 600 shown in FIG. 6 below. The purpose of propagation is to enable shared awareness of states in a networked system and achieve consensus on globally consistent states.

The second challenge is that faults in a distributed and decentralized system will occur dynamically and under various adverse conditions. Embodiments provide comprehensive fault-tolerance mechanisms and fault-aware logic for a fault-tolerant ISM propagation and ensuring mission progress under faults including network partitions. Fault tolerance is explained in more detail in the context of discussion of fault tolerance module 612 of system 600 shown in FIG. 6 below.

The third challenge is to reach quick resolution for conflicting local states. Because an ISM is a perceived state based on local knowledge, it may be incorrect if other nodes have evidence that contradicts the state conveyed in an ISM (opinion message). For example, node A 102 may consider node D's 108 state as down based on its local observation, which may not be correct if, for example, node B 104 has knowledge that D 108 is normal (not down). System 600 takes an evidence-based approach to verify the state in an ISM based on local knowledge each time a receiver receives it. If local knowledge shows that the ISM 204 is incorrectly conveying a state, a node will veto the ISM 204 and echo back the true state to the sender 212 (FIGS. 2 and 5). Eventually the originator of the ISM 204 will retract the ISM 204 upon receiving a correction feedback (i.e., veto). State verification is explained in more detail in the context of discussion of FIG. 6 below of state verification module 624 of system 600.

The fourth challenge is to address uncertainty in state and determine when to merge the state conveyed in the ISM 204 into local record and act on it after a node receiving the ISM 204 (message 204). Because the ISM 204 might carry an incorrect state that might be vetoed by some node, a receiving node that has no evidence to veto the message faces uncertainty on whether to merge the state into local record and potentially take actions based on it. Due to the uncertainty, a receiving node such as the receiver 208 acting on the state may get an incorrect result. System 600 deals with the uncertainty using a two-phase hypothesis/confirmation mechanism/procedure for robust handling of such state uncertainty. The two-phase mechanism comprises a hypothesis phase which conveys a state as a hypothesis before consensus has been reached and a confirmed phase which conveys a confirmed state after consensus has been reached.

System 600 deals with transient states using a two-value state mechanism to prevent actions from being taken before the state is finalized. The two-value state mechanism uses a pair of a transient state value and a final state value. For example, a transient state "going down" 304 before "down" 306 and a transition state "going up" 308 before "up" will be used to enable a receiving node to take caution and wait for the state to finalize in a network such as the network node graph 100. The two-phase mechanism allows a receiving node to merge state when the ISM 204 conveys a confirmed state change. The two-value state allows nodes to take notice of transient state while the propagation is in progress and act on final state when the state is confirmed. The two-phase hypothesis/confirmation mechanism is explained in more detail in the context of discussion of transient state handling module 608 of system 600 shown in FIG. 6 below.

The fifth challenge is to timely discover and remove redundant ISM instances on the same subject 214. For example, both node A 102 and node C 106 detect node D 108 is potentially down and initiate two ISM instances (e.g., one from A 102 and another from C 106). The two ISM instances are duplicates since they are about the same subject at a specific time. It will waste resources and cause delay for the system 600 to reach a consistent state if all such concurrent duplicate ISM instances about the same subject 214 propagate across the system 600. System 600 provides a duplicate resolution algorithm through which only one of the ISM instance will survive and propagate and others will be eliminated as early as possible. The duplicate resolution algorithm is explained in more detail in the context of discussion of duplicate resolution module 622 shown in FIG. 6 below.

The sixth challenge is to determine when propagation is complete throughout the system 600 and a consensus has been reached. System 600 uses a combination of a time-based algorithm and a hierarchical aggregator algorithm for robust fault-tolerant determination of consensus. The time-based algorithm uses a time limit to receive any corrections. If a receiving node in a graph does not echo when it consents on the state (i.e., verification result is not negative), the originator of the ISM 204 will know that a consensus has been reached if and only if it does not receive an explicit veto with a correct state within a time limit (implicit consent by silence). The hierarchical aggregator algorithm uses explicit count of echoes to determine whether a consensus has been reached. Each receiver will echo back to its sender regardless of verification result. The algorithm compares the number of forward propagation paths and the number of backward echo paths. When the numbers match, it is guaranteed that the propagation has completed successfully—all nodes have been visited and none of them has evidence vetoing the state conveyed in the ISM 204. The consensus algorithm is explained in more detail in the context of discussion of consensus determination module 610 shown in FIG. 6 below.

The seventh challenge is to deal with network partitions. When the system as a network of nodes is partitioned, states across multiple partitions will become inconsistent. System 600 uses a combination of partition detection, mission progress under partition, and state synchronization upon merging of two partitions. The network partitions is explained in more detail in the context of discussion of partition detection module 614 and partition detection and synchronization module 616 shown in FIG. 6 below.

Figure 6:
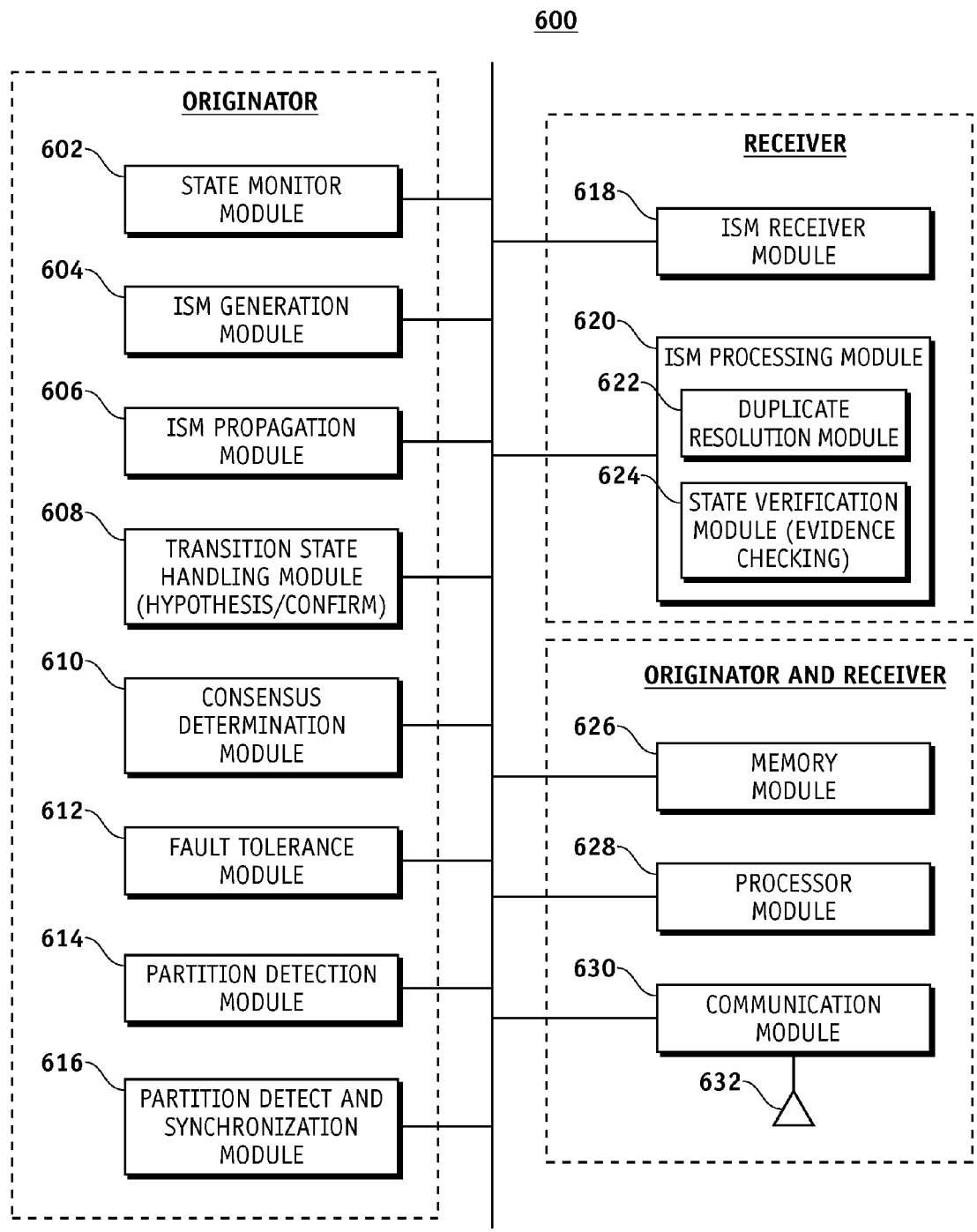
FIG. 6 is an illustration of an exemplary functional block diagram of an information state sharing and consistency maintenance system according to an embodiment of the disclosure.

FIG. 6 is an illustration of an exemplary functional block diagram of an information state sharing and consistency maintenance system 600 (system 600) under conditions of node failures and network partitions in a distributed and decentralized network according to an embodiment of the disclosure. The system 600 may comprise, a state monitor module 602, an ISM generation module 604, an ISM propagation module 606, a transient state handling module 608, a consensus determination module 610, a fault tolerance module 612, a partition detection module 614, a partition detection and synchronization module 616, an ISM receiver module 618, an ISM processing module comprising: a duplicate resolution module 622, and a state verification module 624 (evidence checking module 624), a memory module 626, a processor module 628, and a communication module 630.

The state monitor module 602 is configured to detect any state changes in monitored subjects.

The ISM generation module 604 is configured to generate at a first node from the nodes A102-E110 of the network node graph 502 (FIG. 5) an Information State Message (ISM) in a hypothesis phase which encapsulates the detected new state of a subject with the attributes 402 supporting the reasoning about the type, phase, and required actions of the ISM 204. The ISM at the first node is responsive to detection of an event or condition such that state of the event or condition is encapsulated in the ISM 204. The ISM 204 may initially be assigned a HYPOTHESIS value to the ISM's type code attribute to indicate that the state is in a hypothesis phase.

The message generation module 604 is also configured to indicate a confirmed phase for the ISM 204 if the consensus is reached. The ISM generation module 604 is further configured to modify the ISM 204 to the confirmed phase and propagate a second ISM indicating the confirmed phase to at least one node of the spanning tree 504 of the network 502 if the consensus on the state of the ISM 204 is reached.

The ISM propagation module 606 propagates the ISM 204 to at least one node of the spanning tree 504 of the network 502, the spanning tree 504 has a root at the first node from the nodes A102-E110 of the network node graph 502. The first node is thus named as the originator (e.g., node A 102) for convenience of description.

The ISM propagation protocol comprises actions as follows for the originator and the receivers of each ISM:

An originator detects state changes of observable subjects such as the subject 214 in its neighborhood, generate the ISM 204 on the state of the subject 214 and encode the state as a hypothesis in the ISM 204, and propagate the ISM 204 to the rest of the network 500.

A receiver verifies the hypothesis state received in the ISM 204 based on local evidence. If local evidence contradicts with the state, the receiver echoes a correction ISM back to the sender of the ISM with the "VETO" value for its type code attribute (through neighbor to neighbor communication, the ISM will eventually return to the originator); otherwise, the receiver propagates the ISM to its unvisited neighbors. If there are no more unvisited neighbors, the receiver is considered as a leaf node and may take one of the two options: one is no further action if the consensus determination method is a time-based method; or second is to echo the ISM back to its sender with the "ECHO" value for its type code attribute if the consensus determination method is a hierarchical aggregator method. Upon receiving an ISM with type code attribute as "ECHO", a receiver will continue echo back to the sender of the ISM in its local record until the originator is reached (i.e., the receiver is the originator itself).

An originator determines the true state of the subject based on feedback from the rest of the system. It differentiates whether a consensus on the state in the ISM has been reached or whether a correction on the state in the ISM has been received. It updates the ISM with the true state and encodes the state in a new ISM with the CONFIRMED value for its type code attribute to indicate that the state is confirmed to be true and no further verification is required. It then propagates the ISM to the rest of the network 502.

A receiver modifies its internal record about the subject's state in a received ISM that has the CONFIRMED value as its type code attribute. It propagates the ISM to its unvisited neighbors. If there are no more unvisited neighbors, the receiver is considered as a leaf node and no further action is required. ISM propagation protocol and algorithms are described in more detail in the context of ISM propagation process 700 shown FIG. 7 below.

The transient state handling module 608 is configured to provide a robust two-phase hypothesis/confirmation mechanism for handling state uncertainty during the period when the network 502 is undergoing changes. A two-value state mechanism is designed for handling transient states, constraining actions, and reducing thrashing during a period when global consensus has not yet been reached. This two-value state mechanism defines a pair of values to represent the state of a subject: transient value and true value. For example, a transient value "GOINGDOWN" 304 paired with a true value "DOWN" 306 is used to capture the uncertainty of the health state of a node as probably down.

Because the true state of a subject (e.g., a node is down as detected by another node) conveyed in the ISM 204 is often uncertain due to limitations of local observations and the ISM 204 propagation takes time to reach every node in a system, a receiving node may avoid taking actions based on the state in the ISM before a consensus has been reached. The transient state handling module 608 provides a robust two-phase Hypothesis/Confirmation procedure to handle the transition period.

Two-phase hypothesis/confirmation procedure comprise following two phases:

Phase 1 Hypothesis: The first phase is for an originator node to generate and propagate an ISM as a hypothesis with the "HYPOTHESIS" value for its type code attribute and a transient value for its state attribute using the two-value state mechanism. For example, a transient value "GOINGDOWN" 304 is used to hypothesize that node N is probably "DOWN" 306. A hypothesis ISM is generated and initiated for propagation by an originator node. This hypothesis ISM is propagated in the network 500 using the ISM propagation process 700 described in FIG. 7 below. A receiving node of the ISM 204 will check the type code attribute and update its internal state record. Then it will sustain and propagate, or correct and veto the ISM 204 if it has contradicting evidence. In either case the originating node determines whether the hypothesis of the state is agreed by every other node or whether any of the other nodes has echoed a veto message for a negative confirmation of the hypothesis. In either case, the true state is revealed to the originator and the originator goes to the confirmation Phase 2. For example, in case of consensus, the true state is confirmed to be "DOWN" 306; otherwise, the true state is confirmed to be "NORMAL" 302 (i.e., it is not "DOWN" 306 as has hypothesized).

Phase 2 confirmation: The second phase is a confirmation phase. Following the Phase 1, the originator generates a new ISM with the true value of the state using the two-value state mechanism. For example, a node N is truly "DOWN" 306 or "NORMAL" 302 (as opposed to "GOINGDOWN" 304 or "GOINGUP" 308 transient value, respectively). This ISM has the "CONFIRMED" value for its type code attribute. This confirmed ISM is propagated in the system using the ISM propagation protocol and algorithms described in the ISM propagation process 700. A receiving node of the ISM will check the type code attributed of the ISM and update its internal state record accordingly. Then it will propagate the ISM until all nodes have received the ISM (i.e., the ISM has reached all leaf nodes and no more unvisited nodes to send the ISM).

Without the two-phase hypothesis/confirmation procedure, a receiving node may take actions on a state that may not be confirmed and true. Furthermore, due to propagation delays, some nodes may have received the ISM and acted based on the state in it while others have not and may act based on a different state. The two-phase Hypothesis/Confirmation procedure together with the two-value state mechanism provide that an action may be taken only when a state is confirmed and given its true value.

The consensus determination module 610 is configured to determine whether a consensus regarding the state in the ISM 204 has been received or whether it has been corrected based on the verification opinion (veto) from the at least one node from the nodes 102A-110E. Thus, the consensus determination module 610 determines a consensus regarding the state in the ISM 204 based on the verification opinion from at least one node using a plural of algorithms, based on an estimated propagation time through the spanning tree, or a combination thereof.

Algorithms to achieve shared awareness in a deterministic amount of time in propagating through the nodes in the network 502 and reach consensus are based on the collective methods and mechanisms of ISM, duplicate resolution, state hypothesis/confirmation, transient state, verification, and propagation in a dynamically formed spanning tree 504. The total propagation time is deterministically bounded by the number of edges 112 in the spanning tree 504.

A consensus on the ISM 204 is reached when all receiving nodes have reached non-conflicting decisions based on the ISM. A receiving node may explicitly provide an echo of its decision and related information to the originator of the ISM 204. Or it may be silent (i.e., imply consent without providing an echo) when it reaches a non-conflicting decision (e.g., no evidence to contradict the state in the ISM). A non-conflicting decision is a decision made by a node that is consistent with decisions made by other nodes based on their respective local knowledge.

As a simple example of decision making, a node determines the correctness of the state in a received ISM based on its local knowledge. If the local knowledge contradicts the state, the node may echo back a correction, i.e., a veto, of the state to the originator of the ISM. If necessary by design, a node may echo back a consent message if it has no evidence to contradict the state. A consensus has been reached when all nodes consent with the state, or any of the nodes echoes back a veto.

Two mechanisms to determine whether a consensus has been reached in decentralized systems is described herein. The first mechanism uses a time-based consensus decision by the originator and the second uses a hierarchical aggregator on each node to determine consensus. Regardless of which mechanisms, the decision logic of a node is as follows: When an ISM is propagated through a decentralized system by neighbor-to-neighbor communication (e.g., communication link 112), a node makes a local decision regarding the ISM in two mutually exclusive conditions.

If a non-conflicting decision cannot be made regarding the state in the ISM (e.g., local evidence contradicts the state of the ISM), a receiving node will echo back a correction (or veto depending applications) to the sender of the ISM. Otherwise, i.e., a non-conflicting decision may be made regarding the state in the ISM (e.g., no local evidence contradicts the state of the ISM), it will sustain the ISM 204 and further propagate the ISM 204 to its unvisited neighbors. When there are no unvisited neighbors (i.e., no more nodes to propagate to), it has two options—one is to echo back an explicit consent to the sender of the ISM; another is to stop without an explicit consent to the sender of the ISM.

A combination of a time-based mechanism and a hierarchical aggregator mechanism has been designed for robust and fault-tolerant consensus determination.

Time-based Consensus Determination by the Originator Mechanism: In this mechanism, a node does not give explicit consent to the sender of the ISM when it reaches a non-conflicting decision (i.e., it consents with the state in the ISM). Instead, the originator of the ISM uses a timeout threshold, MaxConsensusTime, to determine whether a consensus has been reached in a decentralized system. If before the MaxConsensusTime is expired, an explicit echo of correction (i.e., a VETO message) propagates back to the originator (from a receiver to sender chain of neighbor-to-neighbor communications), the originator immediately determines that a consensus cannot be reached and immediately transitions to a confirmed phase to propagate the corrected information state.

If after the MaxConsensusTime is expired, no explicit echo of correction (or veto depending applications) is received by the originator, the originator determines that a consensus has been reached and transitions to a confirmed phase to propagate the consensus information state. The MaxConsensusTime may be decided based on an estimate of the time for an ISM to reach every node in a network 502. The advantages of this mechanism comprise its resilience to faults in nodes and communications (as long as the MaxConsensusTime is sufficiently large), and its reduction in communication cost (by avoiding explicit consent echoes). The disadvantages of this mechanism comprise the difficulty to find a good MaxConsensusTime due to dynamism in a decentralized system, and the long time to reach consensus (since the MaxConsensusTime estimation incorporates worst case scenarios). The time-based consensus decision by the originator is explained in more detail in the context of discussion of process 800 shown in FIG. 8.

Hierarchical Aggregator Consensus Determination Mechanism: In this mechanism, each node has a hierarchical aggregator and each node explicitly echoes a consent or a correction message by assigning a proper value to the type code attribute to the sender of the ISM. The hierarchical aggregator in each node collects echoes from its child nodes. For example, as shown in FIG. 5, node E 110 collects echoes from child node C 106, node A 102 collects echoes from children nodes B 104 and E 110. As soon as node A 102 as the originator (and the root of the spanning tree) has collected echoes from both nodes B 104 and E 110, it determines that consensus has been reached.

As shown in FIG. 5, a parent node, say node E 110, receiving a correction from a child node C 106, will immediately echo the correction to the sender of the ISM, which is the parent node (E's parent node is A 102). A parent node (say node A 102) receiving a consent message from a child node (node B 104) will hold it until it has received echoes from all children nodes (node E 110). Thus, node E 110 will not echo a consent message to its parent node A 102, for example, until it has received consent from nodes C 106.

When the originator of the ISM receives a correction from any of its children nodes, node A 102, it immediately determines that a consensus cannot be reached and makes a decision accordingly. If the originator of the ISM receives consent echoes from all of its children nodes, it determines that a consensus has been reached and makes a decision accordingly. The advantages of this mechanism comprise the deterministic amount of time to reach consensus proportional to the height of the spanning tree, and the deterministic amount of echo back messages equal to the edges in the spanning tree due to the fact that each node aggregates information echoed from its children nodes.

The disadvantages of this mechanism comprise the processing and communication overhead for explicit echoes of consent, and the difficulty for a parent node to determine consensus when faults occur in some of its branches of the spanning tree (e.g., the node has to wait until a predetermined time out period if the branch cannot recover). To overcome faults occurring in a spanning tree, an additional time-based consensus decision mechanism is used as a guard against nondeterministic time of waiting in the hierarchical aggregator consensus mechanism. The hierarchical aggregator on each node to determine consensus is explained in more detail in the context of discussion of process 900 shown in FIG. 9.

The partition detection module 614 is configured to calculate the probability of a network being partitioned as an aggregate value of the probability of the nodes being normal, which is defined as 1-P where P is the failure probability, when they are not reachable as explained in more detail in the context of discussion of process 1500 in FIG. 15 below.

Figure 14:
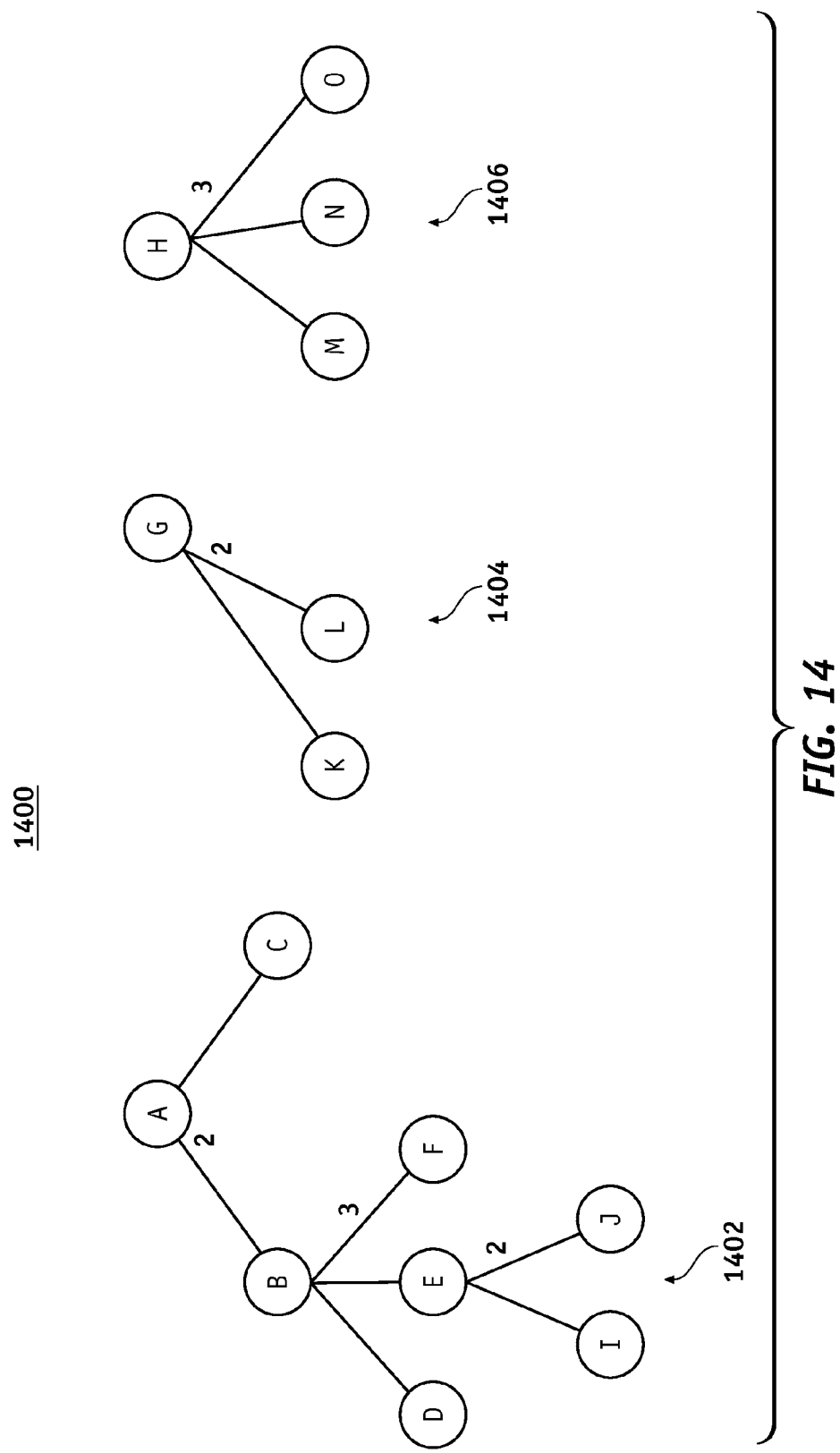
FIG. 14 is an illustration of an exemplary network separated into 3 partitions according to an embodiment of the disclosure.

The partition detection and synchronization module 616 is configured to detect the network is separated into at least two partitions, detect a reconnection of a partition of the network, synchronize the states once two partitions are connected and sustains mission execution with the nodes in the partition. In this manner, the partition detection and synchronization module 616 detects a reconnection of a partition of the network and receives the information state for synchronization from the partition as explained in more detail in the context of discussion of the synchronization upon recovery from partition process 1600 shown in FIG. 16. FIG. 14 shows a network system separated into 3 partitions.

The state verification module 624 (evidence checking) provides a verification opinion by at least one node indicating if the local evidence contradicts with the state in the ISM 204. In this manner, the state verification module 624 checks whether local evidence contradicts the information state in the ISM 204. State verification module uses a mechanism of vetoing or sustaining a state hypothesis based on local evidence. This mechanism provides efficient resolution of any potential conflict between locally perceived state and globally true state for a distributed and decentralized system. This mechanism is explained in more detail in the context of discussion of evidence-based state verification process 1000 shown in FIG. 10.

The duplicate resolution module 622 is configured to resolve duplicate messages at a node of the spanning tree. As explained above, in the context of discussion of FIG. 4, one ISM instance Z is a duplicate of another W when Z is an identical copy of W (i.e., they have the same timestamp, originator, and subject) or Z is about the same subject and state as W (i.e., they are independently observed by two originators). Duplicate resolution module 622 uses a duplicate resolution algorithm through which only one of the concurrent ISM instances of a state will survive and propagate and others will be eliminated as early as possible for efficiency and performance.

Embodiments provide protocols and algorithms for efficient, high performance, and fault-tolerant local detection of state changes, state propagation, consensus management, detection of partition, mission progress, and state synchronization upon recovery from partition in distributed and decentralized mission systems. Fault-tolerance features permeate the protocols and algorithms.

The fault tolerance module 612 is configured to dynamically reconfigure the spanning tree if a fault occurs and is detected in a communication link between at least two of the nodes. Comprehensive fault-tolerance mechanisms and fault-aware logic for fault-tolerant ISM propagations and ensuring mission progress under faults including network partitions are provided.

First, comparing with a centralized approach (communicating through a central authority), system 600 does not have a single point of failure. Messages are propagated through neighbor-to-neighbor communications. Any single failure of a node or a communication link will not cause the propagation to fail when the graph is still a connected graph.

Second, when the graph is no longer a connected graph (i.e., the network of nodes is partitioned), connection conditions may be evaluated to determine whether a partition has occurred and mission execution continues within each partition in a manner that guarantees globally consistent decision making. When two partitions join, a state synchronization algorithm is used to bring the two partitions into consistent state.

Third, state changes including network connect and disconnect events are detected by nodes in a local neighborhood in a timely manner. When detected, such events are encapsulated as instances of ISM and propagated across the graph of nodes for shared awareness.

Figure 18:
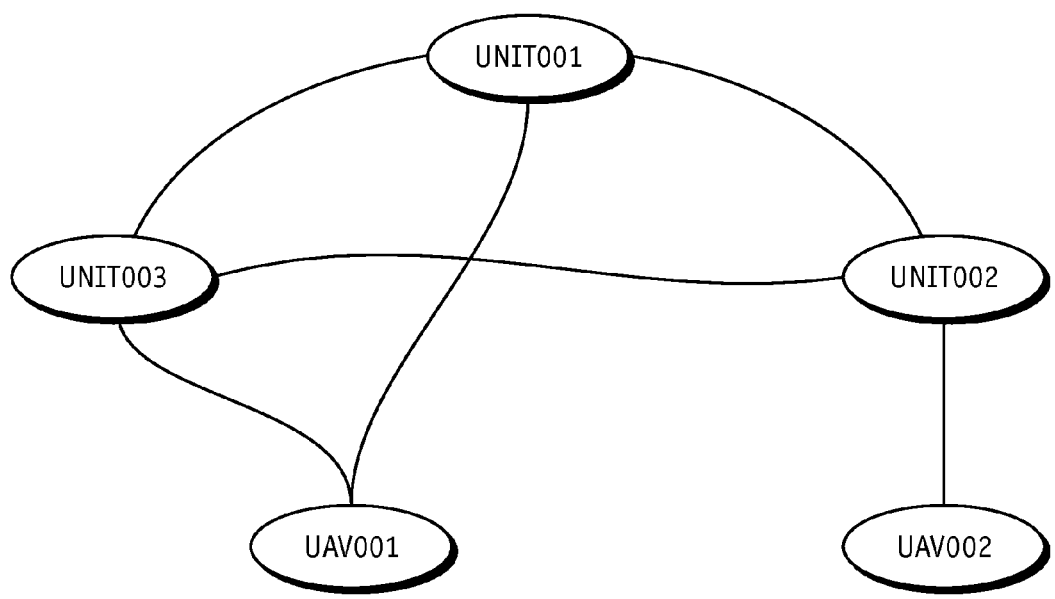
FIG. 18 is an illustration of an exemplary topology of a distributed and decentralized system according to an embodiment of the disclosure.

Fourth, system 600 handles temporary state inconsistency between a node's perceived states of other nodes and the actual states of those nodes. Fault-aware logic is encoded in the solution to detect and handle fault conditions. This is important for distributed and decentralized mission systems because a node acts based on its local knowledge. FIG. 18 shows an example where node Unit003's perceived state of node UAV001 (e.g., normal) is temporarily out of sync with the actual state of node UAV001 (e.g., failed). As a consequence, node Unit003 may propagate an ISM to node UAV001 expecting it to be normal. A fault-aware logic may be encoded in each node such as Unit003 to handle the situation when an expectation is invalid.

The processor module 628 comprises processing logic that is configured to carry out the functions, techniques, and processing tasks associated with the operation of the system 600. In particular, the processing logic is configured to support the system 600 described herein. For example but without limitation, the processor module 628 may manage/direct the state monitor module 602, the ISM generation module 604, the ISM propagation module 606, the transient state handling module 608, the consensus determination module 610, the partition detection module 614, the partition detection and synchronization module 616, the ISM receiver module 618, the ISM processing module comprising: the duplicate resolution module 622, and the state verification module 624 (evidence checking module 624), the memory module 626, and the communication module 630 to carry out the functions, techniques, and processing tasks associated with the operation of the system 600 as explained in more detail below.

The processor module 628 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 626 may comprise a data storage area with memory formatted to support the operation of the system 600. The memory module 626 is configured to store, maintain, and provide data as needed to support the functionality of the system 600 in the manner described below.

In some embodiments, the memory module 626 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 626 may be coupled to the processor module 628 and configured to store, for example but without limitation, a database, and the like. Additionally, the memory module 626 may represent a dynamically updating database containing a table for updating the database, and the like. The memory module 626 may also store, a computer program that is executed by the processor module 628, an operating system, an application program, tentative data used in executing a program, and the like.

The memory module 626 may be coupled to the processor module 628 such that the processor module 628 may read information from and write information to the memory module 626.

As an example, the processor module 628 and memory module 626 may reside in respective application specific integrated circuits (ASICs). The memory module 626 may also be integrated into the processor module 628. In an embodiment, the memory module 626 may comprise a cache memory for storing temporary variables or other intermediate information during execution of instructions to be executed by the processor module 628.

The communication module 630 is configured to send and receive information signals to the nodes A102-E110 via an antenna 632 using various communication protocols.

Those skilled in the art will understand that the various illustrative blocks, modules, circuits, and processing logic described in connection with the embodiments disclosed herein may be implemented in hardware, computer-readable software, firmware, or other combination thereof. To clearly illustrate this interchangeability and compatibility of hardware, firmware, and software, various illustrative components, blocks, modules, circuits, and steps are described generally in terms of their functionality.

In some embodiments, the system 600 may comprise any number of processor modules, any number processing modules, any number of memory modules, any number of transmitter modules, and any number of receiver modules suitable for their operation described herein. The illustrated system 600 depicts a simple embodiment for ease of description. These and other elements of the system 600 are interconnected together, allowing communication between the various elements of system 600. In one embodiment, these and other elements of the system 600 may be interconnected together via a respective data communication bus 634.

A transmitter module and a receiver module may be located in the processor module 628 coupled to a shared antenna 632. Although in a simple module only one shared antenna 632 may be provided, more sophisticated modules may be provided with multiple and/or more complex antenna configurations. Additionally, although not shown in this FIG. 6, those skilled in the art will recognize that a transmitter may transmit to more than one receiver, and that multiple transmitters may transmit to a same receiver.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

The information sharing via ISM propagation is event-driven, scalable, and comprises high performance ISM propagation protocol and algorithms as explained in more detail in the context of discussion of FIG. 7 below. The ISM propagation protocol and algorithms comprises two independent and concurrent activities in each node from the nodes A102-E110 of the network 500. One is to initiate and propagate the ISM 204 as an originator after detecting a state change that may have global significance. The other is to receive and process the ISM 204 as receiver. Each node from the nodes A102-E110 of the network 500 has the capability of being both an originator and a receiver.

System 600 is explained in more detail below in connection with processes 700-1200, 1500-1600 and 1900-2000. The various tasks performed in connection with processes 700-1200, 1500-1600 and 1900 may be performed mechanically, by software, hardware, firmware, or any combination thereof. The processes 700-1200, 1500-1600 and 1900-2000 may be recorded in a computer-readable storage medium such as a semiconductor memory, a magnetic disk, an optical disk, and the like, and may be accessed and executed, for example, by a computer CPU such as the processor module 628 (FIG. 6) in which the computer-readable storage medium is stored. It should be appreciated that processes 700-1200, 1500-1600 and 1900-2000 may comprise any number of additional or alternative tasks, the tasks shown in FIGS. 7-12, 15-16 and 19 need not be performed in the illustrated order, and the processes 700-1200, 1500-1600 and 1900 may be incorporated into a more comprehensive procedure or process having additional functionality not described in detail herein.

For illustrative purposes, the following description of processes 700-1200, 1500-1600 and 1900-2000 may refer to elements mentioned above in connection with FIG. 6. In some embodiments, portions of the processes 700-1200, 1500-1600 and 1900-2000 may be performed by different elements of the system 600 such as: the state monitor module 602, the ISM generation module 604, the ISM propagation module 606, the transient state handling module 608, the consensus determination module 610, the partition detection module 614, the partition detection and synchronization module 616, the ISM receiver module 618, the duplicate resolution module 622, the state verification module 624 (evidence checking module 624), the memory module 626, the processor module 628, the communication module 630, etc. The processes 700-1200, 1500-1600 and 1900-2000 may have functions, material, and structures that are similar to the embodiments shown in FIG. 6. Therefore common features, functions, and elements may not be redundantly described in the processes 700-1200, 1500-1600 and 1900-2000.

Figure 7:
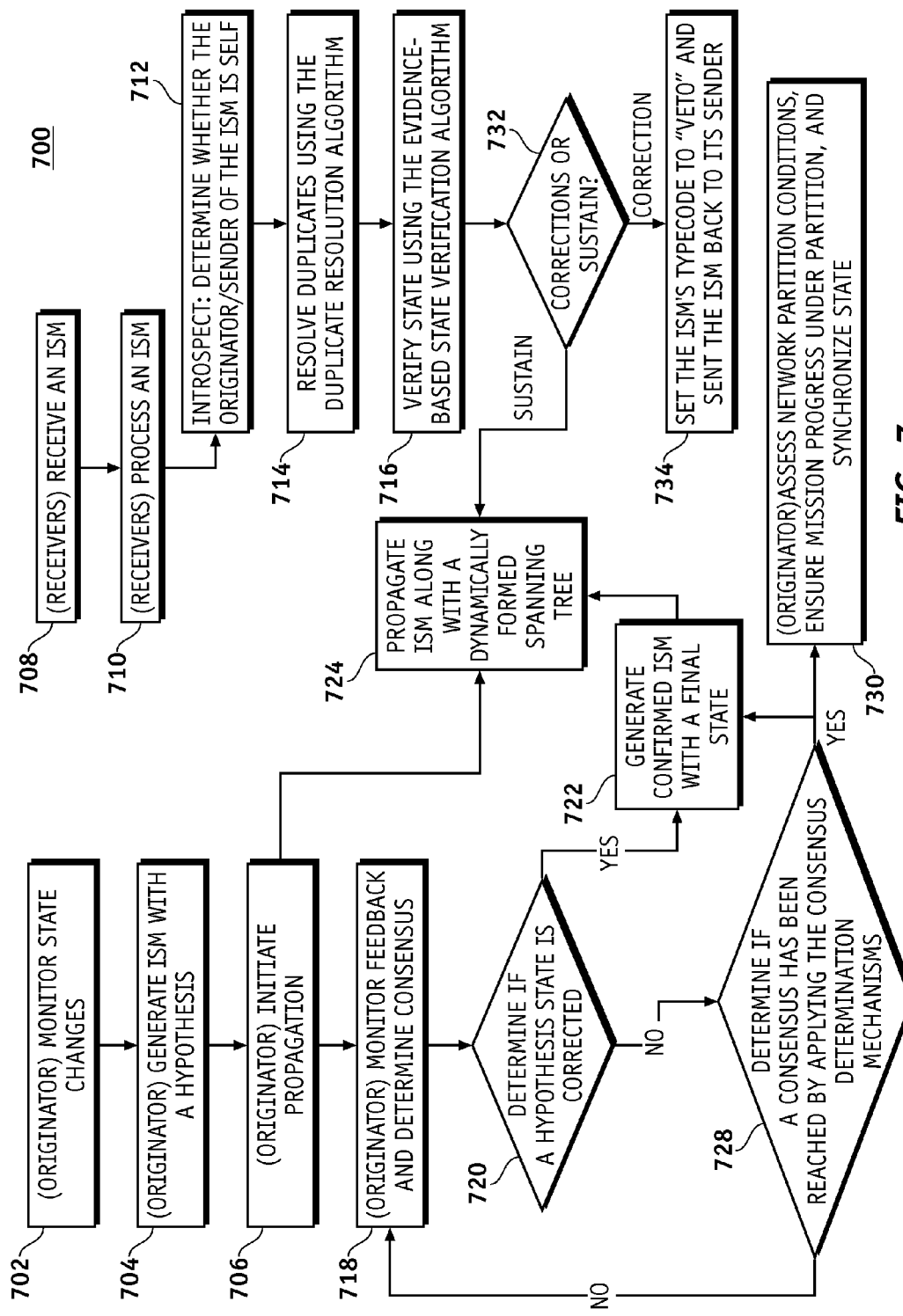
FIG. 7 is an illustration of an exemplary flowchart showing an ISM propagation process of the system of FIG. 6 according to an embodiment of the disclosure.

FIG. 7 is an illustration of an exemplary flowchart showing the ISM propagation process 700 of the system 600 according to an embodiment of the disclosure.

Process 700 may begin by the state monitor module 602 (Originator) monitor state changes (task 702). The state monitor module 602 monitors and detects state changes in the originator's neighborhood such as the external state of a neighbor node N (e.g., a neighbor is disconnected). If a state change is detected, the state monitor module 602 sets the state in the originator's local record. For example, if a neighbor is disconnected, the originator's local record sets its state as "GOING DOWN".

Process 700 may continue by the ISM generation module 604 of the originator generating an ISM with a hypothesis (task 704). The ISM generation module 604 generates an ISM 204, encapsulating the state to be conveyed in the message 204, sets values for important attributes 402 of ISM 204 comprising the timestamp 404, the originator 406, the subject 214, the subject's state 408, the sender 212 (initialized as the originator itself), the sender's neighbors 410, the visited nodes 412 (initialized as an empty set), and the typeCode 416 (initialized as "HYPOTHESIS").

Process 700 may continue by the ISM propagation module 606 at the originator initiating propagation of the ISM 204 (m1) (task 706). The ISM propagation module 606 adds the originator (itself) to the list of the visited nodes 412 in the ISM 204 and send the ISM 204 to all originator's neighbors (its neighbors).

Process 700 may continue by the ISM receiver module 618, at receivers receive the ISM 204 (m1) (task 708).

Process 700 may continue by the ISM processing module 620 at the receivers processing the ISM 204 (m1) (task 710).

Process 700 may continue by the ISM processing module 620 introspecting (task 712). If m1's originator equals to this node (i.e., this receiver is the originator of m1 go to task 718. Otherwise, if m1's typeCode is "ECHO", retrieve an ISM, m0, from this node's record table where m0 was the original ISM sent to the child node although some of the attributes (e.g., "typeCode") in m1 might have been updated by the child node. Replace m0's typeCode by m1's typeCode and determine whether further echo is required based on the consensus determination mechanisms used (not required for the time-based mechanism 800, required for the hierarchical aggregator mechanism 900). If further echo is required, send m0 to m0's sender. If none of the above, go to task 714.

Process 700 may continue by the duplicate resolution module 622 resolving duplicates (task 714). If the current node's record table already has an ISM, m0, occupying the entry for m1's subject (each subject has an entry in the record table), the duplicate resolution module 622 resolves the duplicates as explained in more detail in the context of discussion of duplicate resolution process 1100 of concurrent messages shown in FIG. 11 below to resolve any duplication situations between m0 and m1. Otherwise (i.e., the entry of the subject in the record table is empty), m1 is assigned to the entry of the subject in the record table.

Process 700 may continue by the state verification module 624 (evidence checking module 624) verifying state (task 716). The state verification module 624 verifies whether local evidence contradicts with the state value on the subject in m1 as explained in more detail in the context of discussion of evidence-based state verification process 1000 shown in FIG. 10. If there is a contradiction, a modified m1 (with a new typeCode value "VETO") is sent back to m1's sender; otherwise process 700 leads to task 724 and proceeds to propagate the ISM 204.

Process 700 may continue by the consensus determination module 610 at the originator monitoring feedback and determining consensus (task 718). The consensus determination module 610 sets conditions under which a consensus has reached, monitors ISM 204 returns and determines whether consensus on the state conveyed by the ISM 204 has been reached. Upon receiving m1, the consensus determination module 610 performs the following sub-tasks.

Determine whether a hypothesis state is corrected (inquire task 720). For each received m1, determine whether m1's originator equals to this node and m1's typeCode equals to "VETO". If yes, the hypothesis state is corrected. Do the following sub-steps.

Reset the state of the subject to the corrected state in the ISM. For example, reset the state from "GOINGDOWN" to "NORMAL" when a hypothesis state value "GOING-DOWN" is corrected.

Generate confirmed ISM state with a final state (task 722). For example, generate a new ISM with the subject's state set to the corrected state (e.g., "NORMAL") and the typeCode attribute set to "CONFIRMED".

Discard any ISM instances of the same timestamp and originator received in the future.

Process 700 then propagates ISM along with a dynamically formed spanning tree (task 724).

Process 700 may continue by the consensus determination module 610 determining whether a consensus has been reached (inquiry task 728). If yes, generates a new ISM with the subject's state set to the true value of the consensus state (e.g., change "GOINGDOWN" to "DOWN") and the typeCode attribute set to "CONFIRMED" and proceed to task 724 to propagate ISM. Otherwise, continue to task 718 to monitor feedback and determine consensus. The consensus determination mechanisms is explained in more detail in the context of discussion of processes 800-900 shown in FIGS. 8-9 below.

Propagate the ISM 204 with a confirmed true state using task 724 as described in detail below.

724 (Receivers) Propagate ISM along with a dynamically formed spanning tree: Let v equal to this node's neighbors— m1's visited nodes—m1's sender's neighbors. If v is NOT an empty set, create a copy of m1 as m1_copy, add this node to m1_copy's visitedNodes attribute, set m1_copy's sender attribute to this node, replace m1_copy's sendersNeighbors attribute by this node's neighbors. Propagate m1_copy to all nodes in v. If v is an empty set { } and m1's typeCode is "HYPOTHESIS", assign "ECHO" to the typeCode of m1 and echo m1 back to its sender; if v is an empty set { } and m1's typeCode is "CONFIRMED", no further action is required.

Process 700 may continue by the partition detection module 614, and the partition detection and synchronization module 616 at the originator assessing network partition conditions (task 730). If network partition is detected, process 700 may ensure mission progress under partition and synchronize state when two partitions rejoin. If consensus has been reached about the final state, the network partition detection, a mission progress under partition, and state synchronization upon recovery from partition algorithms are applied as explained in more detail in the context of discussion of: partition detection process 1500 in FIG. 15, mission progress under partition process 1200 in FIG. 12, and synchronization upon recovery from partition process 1600 (synchronization process 1600) in FIG. 16 respectively.

The system 600 and the methods are scalable because the detection of state changes is done locally, the propagation is through neighbor-to-neighbor communications without the need of a central authority, and the maximum number of messages propagated across a network graph is in the worst case less than or equal to the number of edges in the graph.

The system 600 and the methods are high performance because the propagation follows a dynamically formed spanning tree, the maximum time to reach a consensus is proportional to the tree height, and mechanisms including duplicate resolution and evidence-based state verification reduce redundant propagation and stop unnecessary propagation early.

The system 600 and the methods are fault-tolerant because faults are detected by nodes in local neighborhood, mechanisms are provided to assess network partitions and ensure mission progress under partitions, and algorithms are defined to support state synchronization upon partitions rejoin.

Figure 8:
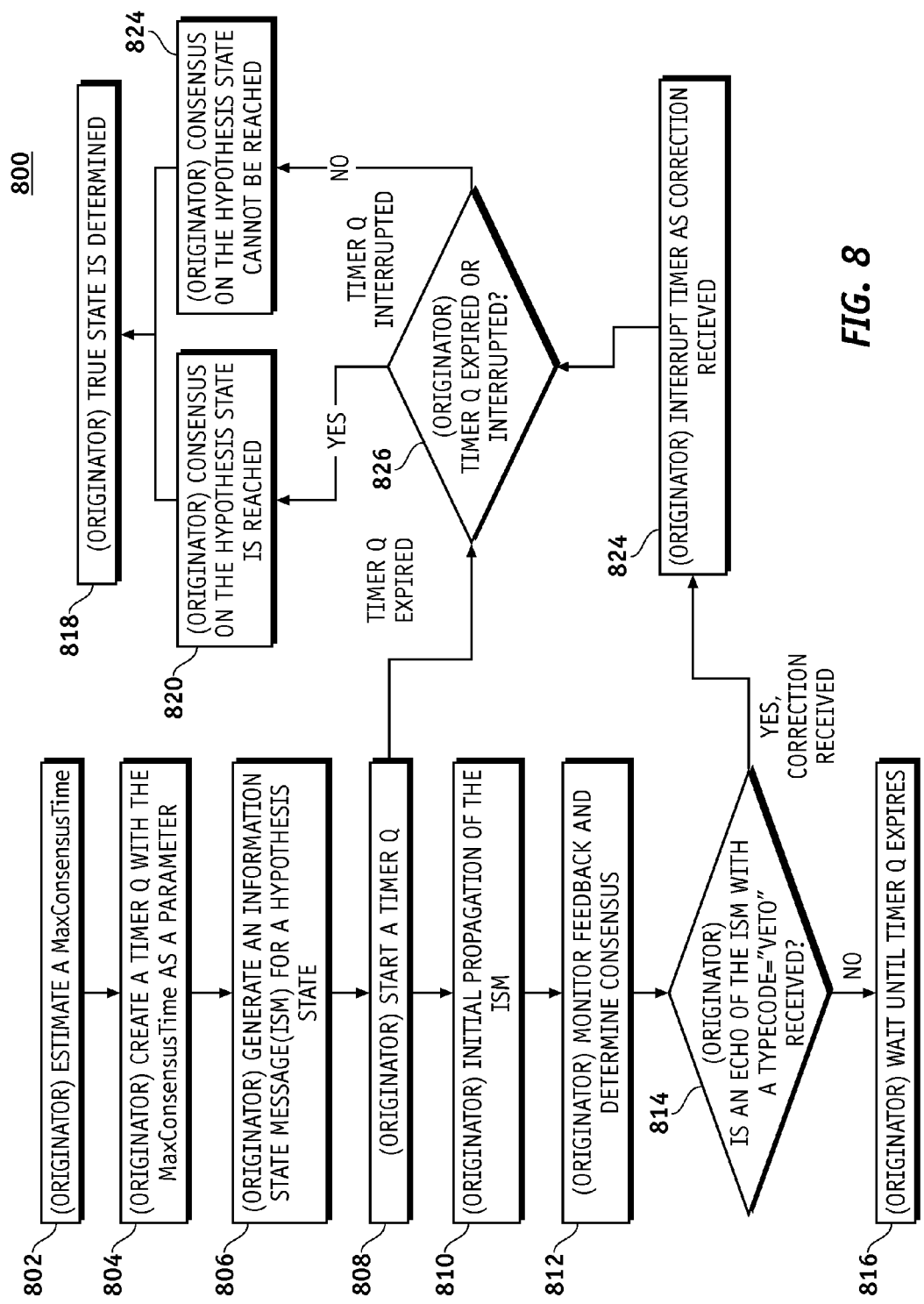
FIG. 8 is an illustration of an exemplary flow chart showing a time-based consensus determination process of the system of FIG. 6 according to an embodiment of the disclosure.

FIG. 8 is an illustration of an exemplary flowchart showing a time-based consensus determination process 800 that may be performed by the system 600 according to an embodiment of the disclosure.

An Originator node R observed a state change on a subject, generated an ISM about the state, and initiated propagation of the ISM 204.

(Originator) Estimates a MaxConsensusTime value based on the knowledge of the number of nodes in the system, the communication delay characteristics, and the connection density and geo distance of the nodes (task 802).

(Originator) Create an instance of a Timer Q with the MaxConsensusTime as a parameter (task 804).

(Originator) Create an ISM for a hypothesis state (task 806).

(Originator) Once the propagation of the ISM is initiated (task 810), start the timer Q (task 808).

(Originator) Monitor feedback and determine consensus (task 812). Task 812 is the same as the task 718 in the ISM propagation process 700 described above.

(Originator) Determine whether an echo of the ISM 204 with a typeCode="VETO" is received (inquiry task 814).

(Originator) If no (No branch of inquiry task 814), continue waiting for any echo until timer Q expires (task 816).

(Originator) If yes, (Yes branch of inquiry task 814), interrupt timer Q since a correction is received (task 824).

(Originator) Determine whether timer Q has been naturally expired or interrupted (inquiry task 826).

(Originator) If timer Q is expired (Yes branch of inquiry task 826), consensus has been reached (task 820) because no correction is received. If timer Q is interrupted (no branch of inquiry task 826), consensus on the hypothesis cannot be reached (task 824) because a correction is received. In either case, the true state of the subject 214 is determined (task 818).

Figure 9:
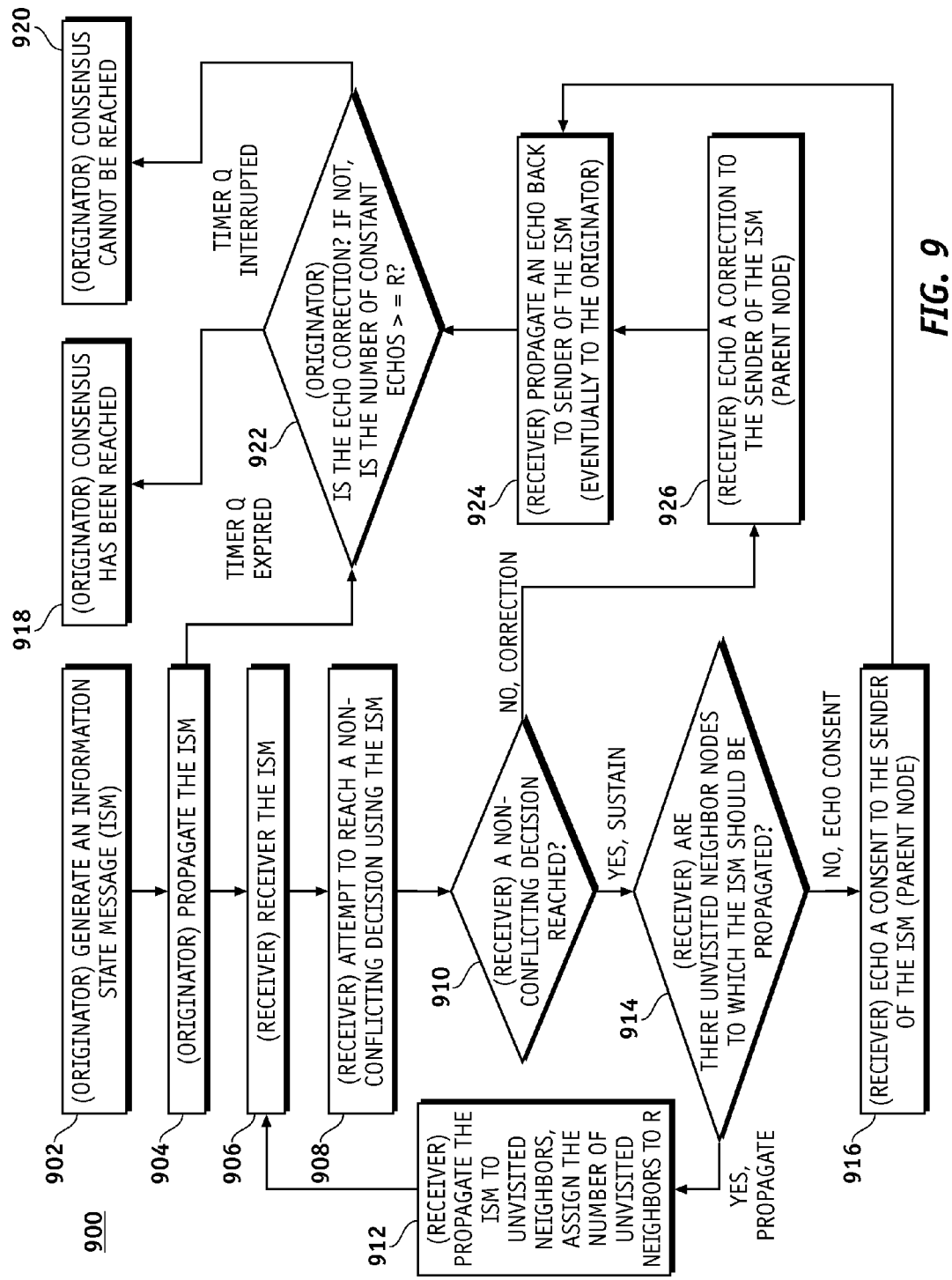
FIG. 9 is an illustration of an exemplary flowchart showing a hierarchical aggregator consensus determination process of the system of FIG. 6 according to an embodiment of the disclosure.

FIG. 9 is an illustration of an exemplary flowchart showing a hierarchical aggregator consensus determination process 900 of the system 600 according to an embodiment of the disclosure.

Process 900 may begin by the originator generating an ISM (task 902).

Process 900 may continue by the originator propagating the ISM 204 (task 904). Process 900 may then continue to inquiry task 922.

In the inquiry task 922, the originator determines whether the echo is a correction, if not, is the number of consent echoes>=R. If the number of consent echoes>=R, the originator determines the consensus has been reached (task 918). Otherwise, if the echo is correction, the originator determines the consensus cannot be reached (task 920).

In the task 906 the receiver propagates the ISM 204.

Process 900 may then continue by the receiver attempting to reach a non-conflicting decision using the ISM 204 (task 908).

Process 900 may continue by the receiver determining whether a non-conflicting decision is reached (inquiry task 910).

If yes (Yes branch of inquiry task 910) receiver determines whether there are unvisited neighbor nodes to which the ISM 204 should be propagated (inquire task 914). If yes (Yes branch of inquiry task 914), receiver propagates the ISM 204 to unvisited neighbors, and assigns the number of unvisited neighbor to R (task 912). Where R represents the number of children nodes to which the ISM 204 is propagated and thus the number of consent echoes to receive. Otherwise (No branch of inquiry task 914), the receiver echoes a consent to the sender of the ISM (parent node) (task 916) and proceeds to task 924. In the task 924 the receiver propagates an echo back to sender of the ISM (eventually to the originator). The process 900 may then continue with the inquiry task 924 as explained above.

If no (No branch of inquiry task 910), the receiver echoes a correction to the sender of the ISM (parent node) (task 926) and proceeds to task 924.

Figure 10:
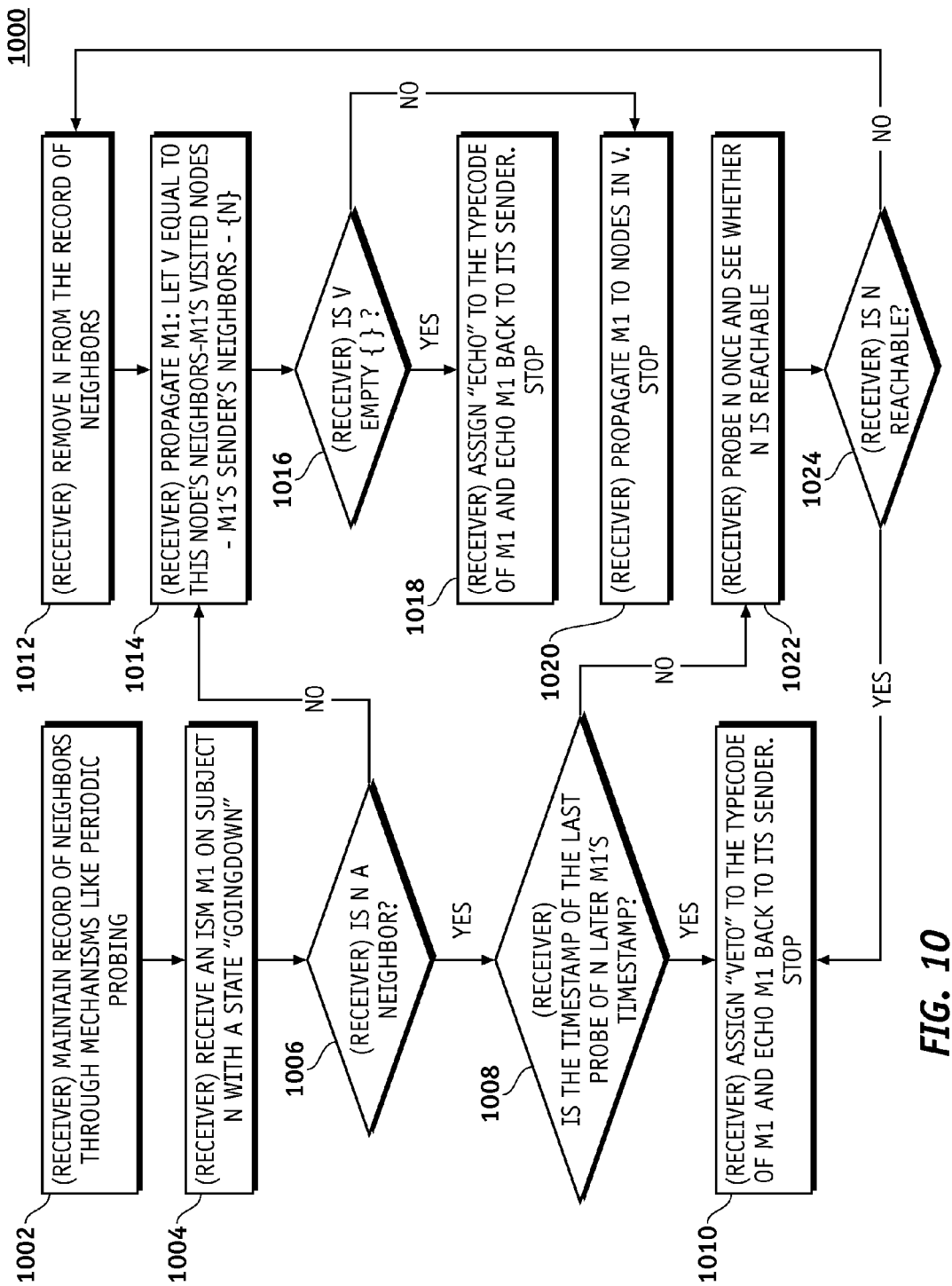
FIG. 10 is an illustration of an exemplary flow chart showing an evidence checking process to verify a state received against local observations in the system of FIG. 6 according to an embodiment of the disclosure.

FIG. 10 is an illustration of an exemplary flowchart showing an evidence checking process 1000 to verify the state received against local observations in the system 600 according to an embodiment of the disclosure. In a distributed and decentralized system, a node makes decisions based on its local knowledge and the information state sharing it receives from its neighbors through the propagation of ISMs. The local knowledge may be different from the global knowledge, i.e., sometimes a node may perceive a state of a subject in its neighborhood inconsistent with the true state of the subject. For example, a node R detects that it has lost communication with a neighbor N and perceives neighbor N as in a "GOING-DOWN" or "DOWN" state. The true state of N might be different, however. For example, N might still be normal and but have moved away from R and is no longer reachable from R. Therefore, the true state of N is uncertain from R's local knowledge.

Because the state of N may be of global significance, R may generate an ISM about N and propagate the ISM to other nodes in the system. A receiving node of the ISM may make a decision based on local knowledge. The decision may be a conflicting or non-conflicting decision with regard to the state of the subject in the ISM. In the case of a conflicting decision, the receiving node corrects the state in the ISM with the true state based on evidence in its local knowledge. The correction is also known as a veto. Through local verifications, a global consensus will be reached on the true state of the node N.

Process 1000 is described using the health state of the nodes in a system as an example to simplify the understanding. It is applicable to any other types of states in a decentralized system. One thing to note is that an "ECHO" typeCode is used explicitly to let a parent node know that an ISM has reached a leaf node.

An example of the process 1000: An ISM m1 is propagated in the network system. As an example, let the subject of m1 be the target node N and the state of subject N be "GOING-DOWN". ISM m1 is propagated to node X. Node X maintains local record (including the state of its neighbors through mechanisms like periodic probing).

Process 1000 may begin by the receiver maintaining records of neighbors (task 1002) through mechanism such as periodic probing.

Node X receives ISM m1 from one of its neighbors (task 1004).

Check X's local knowledge regarding the subject information in m1 (in the example, whether N is X's neighbor) (inquiry task 1006).

If X's local knowledge does not contradict the state in m1 (in the example, if N is not a neighbor of X) (No branch of inquiry task 1008), sustain the ISM and propagate m1 to X's unvisited neighbors (task 1014). Node X as a receiver propagates m1 along a dynamically formed spanning tree. Let v equal to this node's neighbors—m1's visited nodes—m1's sender's neighbors. If v is not an empty set (No branch of inquiry task 1016), create a copy of m1 as m1_copy, add this node to m1_copy's visitedNodes attribute, set m1_copy's sender attribute to this node, replace m1_copy's sendersNeighbors attribute by this node's neighbors. Propagate m1_copy to all nodes in v (task 1020) and count the number of successful propagations to nodes in v and stop. If v is an empty set, follow the following conditional actions: If m1's typeCode is "HYPOTHESIS" and either count is 0 (not reaching to anyone in v) or v is an empty set { } (Yes branch of inquiry task 1016), assign "ECHO" to the typeCode of m1 and echo m1 back to its sender and stop (task 1018); if v is an empty set { } and m1's typeCode is "CONFIRMED", no action.

If X's local knowledge does contradict the state in m1 (in the example, N is a neighbor of X) (Yes branch of inquiry task 1006) and the timestamp of local knowledge (in the example, the timestamp when N is the last probed by X) is later than m1's time stamp (Yes branch of inquiry task 1008), assign "VETO" to the typeCode of m1 and echo m1 back to its sender and stop (task 1010).

Otherwise (No branch of inquiry task 1008), i.e., the contradicted local knowledge is now outdated, update the local knowledge (in the example, probe N once and see whether N is directly reachable) (task 1022). If the updated local knowledge still contradicts the state in m1 (in the example, N is reachable during the probe) (Yes branch of inquiry task 1024), assign "VETO" to the typeCode of m1 and echo m1 back to its sender and stop (task 1010). If the updated local knowledge does not contradict the state in m1 (in the example, N is not reachable during the probe) (No branch of inquiry task 1024), remove N from X's neighbors (task 1012) and sustain the m1 and proceed to task 1014 to propagate m1.

Figure 11:
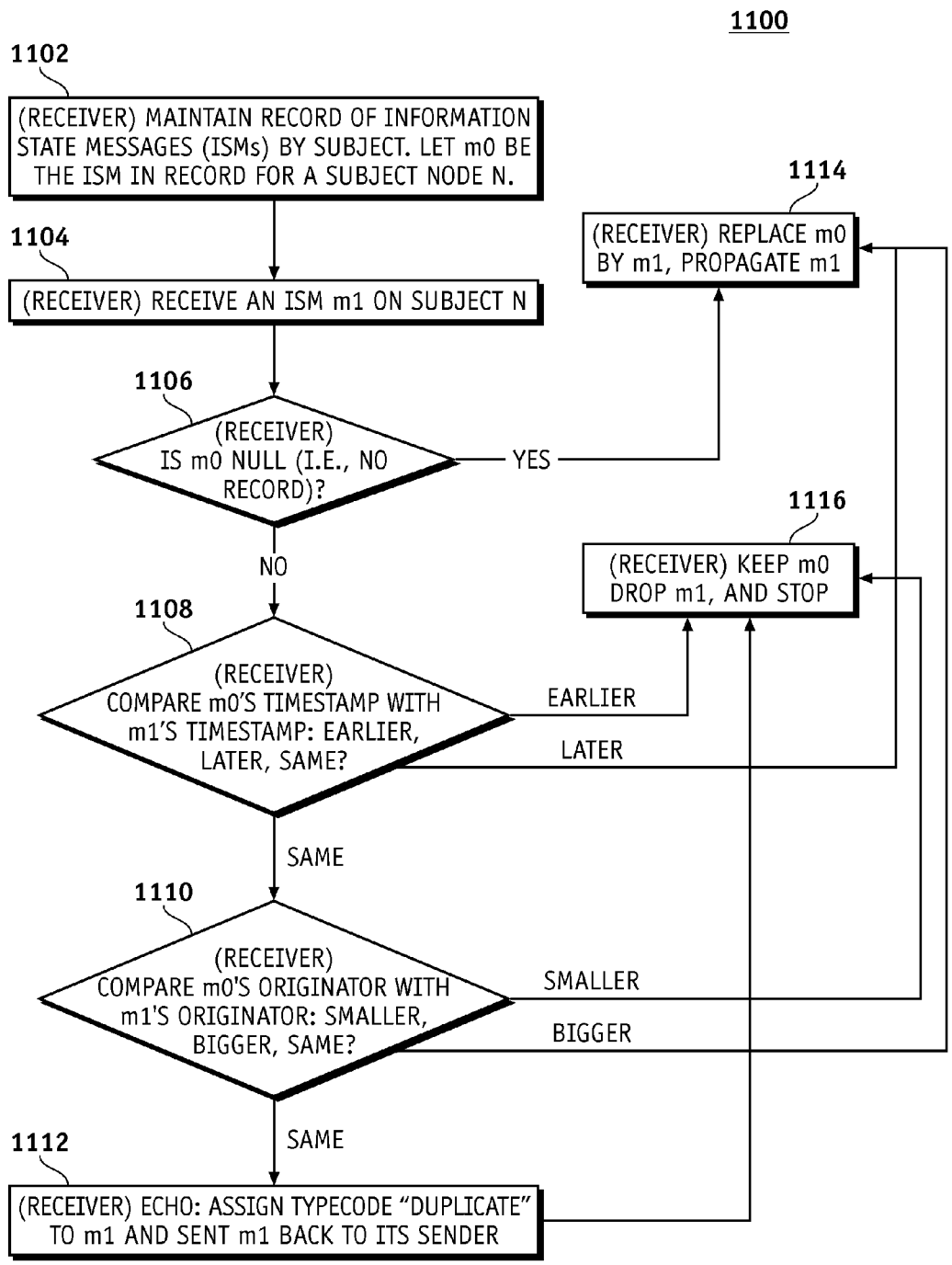
FIG. 11 is an illustration of an exemplary flowchart showing a duplicate resolution process of the system of FIG. 6 according to an embodiment of the disclosure.

FIG. 11 is an illustration of an exemplary flowchart showing a duplicate resolution process 1100 of the system 600 according to an embodiment of the disclosure. Multiple concurrent information state messages (ISMs) originated from different nodes on the same "subject" and "state" are duplicates. Multiple nodes in a decentralized system may detect the "state" of a "subject" (e.g., subject Node N is in a down state) based on their respective local neighborhood knowledge. Thus duplicated ISMs may be generated and disseminated by multiple nodes concurrently. Two ISMs on the same "subject" and "state" are first differentiated by their timestamps. If the timestamps are the same, the two ISMs are then compared by the alphabetical order of their originators. FIG. 5 shows an example where two neighbors of node D both detect the state changes of D. In this example, node D is going down.

Both D's neighbors A and C detect D's state change and each generates an ISM about it around the same time. The two ISMs messages are duplicates since they are about the same state of the same target node. Duplicated messages waste system resources in processing and propagating them. For efficiency, duplicated messages should be detected and resolved so that only one of them will propagate in the system 600. The duplicate resolution process 1100 ensures only one of the messages will survive and propagate across the system 600 while others will be detected and eliminated as early as possible. Intuitively, a message generated earlier has propagated in the system longest and thus it is more efficient to keep earlier while dropping later duplicate messages.

In the process 1100 IDs of the node and node R are defined as follows:

The IDs of the nodes in the graph of a decentralized system are globally unique.

This node R receives an information state message (ISM) m1 on a subject node N.

Process 1100 may begin by the node R maintaining a record on the ISMs generated/received (task 1102). This record may be represented in a table. The number of rows in the table is the number of subjects (nodes in the case of a graph model) in the system and each row is a slot for holding a message on a subject (a target node in the case of a graph model).

Let m0 be the message in node R's record for subject node N, m1 be the message received on subject node N (task 1104).

If m0 is null (i.e., no record) (Yes branch of inquiry task 1106), save m1 to m0 in record (task 1114). No duplicate and stop.

In the case of m0 not null (No branch of inquiry task 1106) process 1100 may continue by following tasks depending on whether the timestamp is earlier than, later than or same as m1's timestamp:

If m0's timestamp is earlier than m1's timestamp, no action, i.e., m1 is dropped (task 1116) since m0 is earlier and propagated longest. Process 1100 ends.

If m0's timestamp is later than m1's timestamp, replace m0 by m1 in the record and propagate m1 (task 1114).

If m0's timestamp is same as (equal to) m1's timestamp, compare the IDs of the originators of m0 and m1 (inquiry task 1110). If m0's ID is smaller than m1's ID, no action (task 1116); if bigger, replace m0 by m1 in the record and propagate m1 (task 1114).

Otherwise, m0 and m1 must be different instances of the ISM originated by the same node with the same timestamp and propagated along different sibling branches of the spanning tree. Assign a "DUPLICATE" value to m1's typeCode and send it back to m1's sender (i.e., echo) (task 1112). The sender of m1 will recognize the "DUPLICATE" typeCode and cut the path to node R in the dynamically forming spanning tree for ISM instances with the same originator and timestamp.

Process 1100 favors the message with oldest timestamp since it is the one that has propagated in the system for the longest time and should have reached more nodes than messages with newer timestamp do. Assigning a typeCode "DUPLICATE" to ISM m1 is needed only when m0 and m1, as two copies of the same ISM, are propagated along two paths to reach node R and by using the typeCode "DUPLICATE", the later sender of m1 to R will know that the link to node R should not be incorporated into the dynamically formed spanning tree (otherwise a cycle would form and violate spanning tree property). In all other cases of duplicates where m0 and m1 are not identical copies from the same originator with the same timestamp, they are duplicates generated by and propagated from different originators and our algorithm ensures that one and only one of them will continue propagating.

Figure 12:
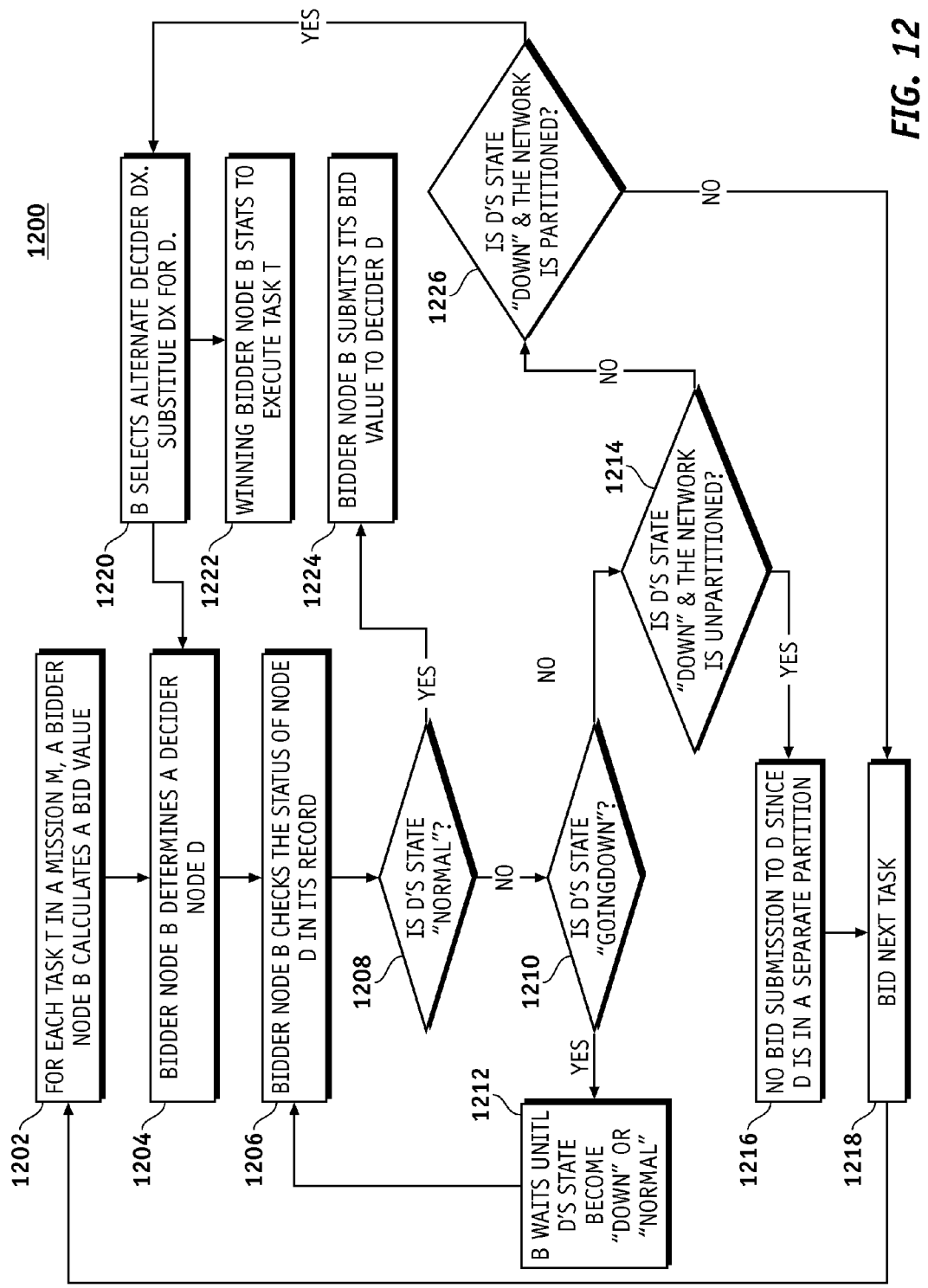
FIG. 12 is an illustration of an exemplary flowchart showing a mission progress under partition process (for auction-based task allocation with guaranteed global consistency) of the system of FIG. 6 according to an embodiment of the disclosure.

FIG. 12 is an illustration of an exemplary flowchart showing a mission progress under partition process 1200 (for auction-based task allocation with guaranteed global consistency) of the system 600 according to an embodiment of the disclosure. A network is partitioned when nodes in the network are separated into two or more isolated groups due to node or communication failures. System 600 and methods support resilient mission execution under partitions in a distributed and decentralized system with three mechanisms. First, network partition is detected at the end of an information state message (ISM) propagation process—network partition detection. Second, mission execution continues making progress within each partition—mission progress under partition. Third, automatic state synchronization upon recovery from partition enables mission execution to seamlessly continue when two or more partitions rejoin—state synchronization upon recovery from partition.

When a mission is executed in a distributed decentralized system, each node will take on tasks based on a strategy like a bid-decide cycle. For example, in a decider-based bid-decide approach, each node as a bidder determines its bid value for a task, selects a globally unique decider among peer nodes, sends bid value to the decider, and waits for decider's decision. The selected decider collects bids, determines the winning bid, and informs all bidders its decision. The winning bidder will execute the task. Key to this approach is the selection of a globally unique decider among peer nodes: given a task, every bidder node selects the same decider node without prior coordination. This is typically accomplished by a common hash function that all nodes use.

The challenge, however, is what to do when the selected decider node is unreachable. This "what to do" depends on the belief each bidder node has on whether the decider node is down (i.e., failed), or is normal but in a separate partition. More importantly, all bidder nodes in the same partition reach a consensus on whether the decider node is down or partitioned so that they will take a conflicting-free action to determine "what to do". If all nodes in a partition believe the decider is down, all nodes will use a common mechanism to find a backup decider so that mission progress may be made using resources in this partition. If all nodes in a partition believe the decider is normal but partitioned (i.e., in a separate partition), no action is needed for this partition because mission progress will be made using resources in the partition to which the decider belongs.

As shown in FIG. 14 a system is separated into 3 Partitions 1402, 1406, 1408, nodes G, K, and L are partitioned in the second partition and unreachable from other partitions. For a particular task T, if the decider node is K, no action is required for the first partition (with nodes A, B, C, D, E, F, I, & J) since K is unreachable from the first partition and the system 600 correctly has determined that K is not down, but exists in a separate partition. Mission progress will be made on task T using resources in the second partition (using nodes G, K, L). On the other hand, if node K is indeed down and all nodes in each partition have consensus that node K is down, a backup decider will be selected by a common function, e.g., re-run the hash function using the result of the first run of the hash function as an input. For example, node C may be selected as a backup decider and mission progress for task T will be made in the first partition to which node C belongs.

Referring to FIG. 12, for each task T in a mission M, a bidder node calculates a bid value and determines a decider node D using a common hash function with T as an input (task 1202).

Each bidder node checks the status of node D in its record (task 1204).

If D's state is marked as "NORMAL", bidder node submits the bid value to D and waits for a decision from D (task 1208).

If D's state is marked as "GOINGDOWN" (task 1210) (a transient state), bidder node waits until D's state becomes "DOWN" or "NORMAL" (task 1212).

If D's state is marked as "DOWN" (and D is in its list of unreachable nodes) and the network is marked "UNPARTITIONED" (task 1214), no bid submission is made to D (e.g., since D is in a separate partition) (task 1216) and the process continues at bid next task (task 1218).

If D's state is marked as "DOWN" (and D is in its list of unreachable nodes) and the network is marked "PARTITIONED" (task 1226), re-runs the hash function with T and D as input and selects alternate decider Dx, and repeats task 1204 above substituting D by Dx (task 1220).

A bidder node that receives the decider's decision of winning bid starts to execute task T (task 1222).

Figure 13:
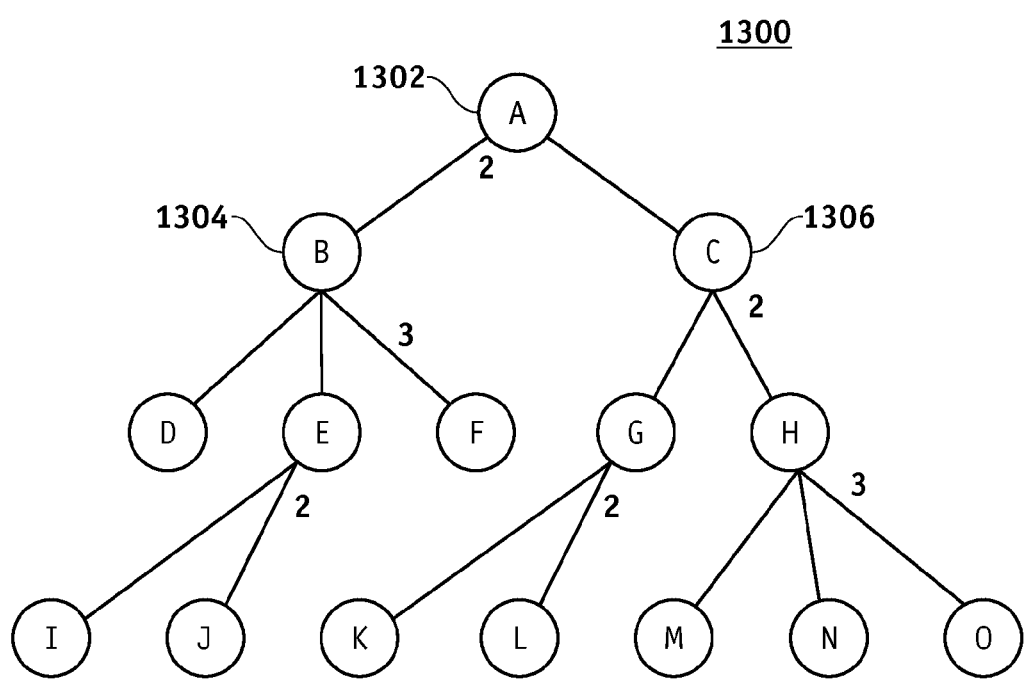
FIG. 13 is an illustration of an exemplary hierarchical aggregator consensus determination process showing building consensus across a dynamically generated spanning tree using a hierarchical aggregator mechanism where each parent node gathers consents from children nodes according to an embodiment of the disclosure.

FIG. 13 is an illustration of an exemplary hierarchical aggregator consensus determination process showing building consensus across a dynamically generated spanning tree using a hierarchical aggregator mechanism where each parent node gathers consents from children nodes according to an embodiment of the disclosure.

FIG. 14 is an illustration of an exemplary network 1400 separated into 3 partitions 1402, 1404, and 1406 according to an embodiment of the disclosure. There is no central authority to monitor and reason about the state of nodes or communications in a distributed and decentralized system. In such a system, each node makes its own observations and reason about the state of nodes and communications within its own neighborhood (i.e., the nodes it has connections with). To enable the information sharing across the nodes in the system, information state message (ISM) may be generated and initiated for propagation by any node when it believes the ISM is relevant to other nodes and for the benefits of the missions ongoing in the system.

As discussed in the consensus determination mechanisms, an originator of an ISM may use the time-based consensus determination mechanism 800 or the hierarchical aggregator consensus mechanism 900, or a combination of the two, to determine whether a consensus has been reached (or a correction has been received). In particular, the hierarchical aggregator consensus mechanism counts the number of consent echoes, from leaf nodes and level by level in the spanning tree until the echoes reach the root, i.e., the originator. As shown in FIG. 13 a total number of echoes equal to the sum of all branches: 2+3+2+2+2+3=14, which is the total number of nodes in the system minus 1 (the root). In the case of network partition, the number of echoes will be smaller than the total number of nodes in the system minus 1.

When a node is separated from a partition, it becomes unreachable from any nodes in that partition. A node may become unreachable due to two reasons: it has failed, or it is normal but some communications with it are lost. Note that the state of being unreachable is relative to a partition. Nodes G, K, L are in one partition and are reachable to each other. They are unreachable from the other two partitions. From the point of view of any node in a partition, nodes in other partitions are all unreachable An important challenge in determining whether a network is partitioned in a decentralized system is to resolve the ambiguity between the situation that one or more nodes have failed and the situation that those nodes are normal but partitioned. When one or more nodes are not reachable, it is difficult, if possible, to tell for sure whether those nodes have failed or are normal but partitioned in a distributed, decentralized system. There is no super reliable central authority to know the status of the entire network. Our technique to resolve the ambiguity between the two situations (failed versus partitioned) is to first define the failure probability P of a node when it is not reachable.

Figure 15:
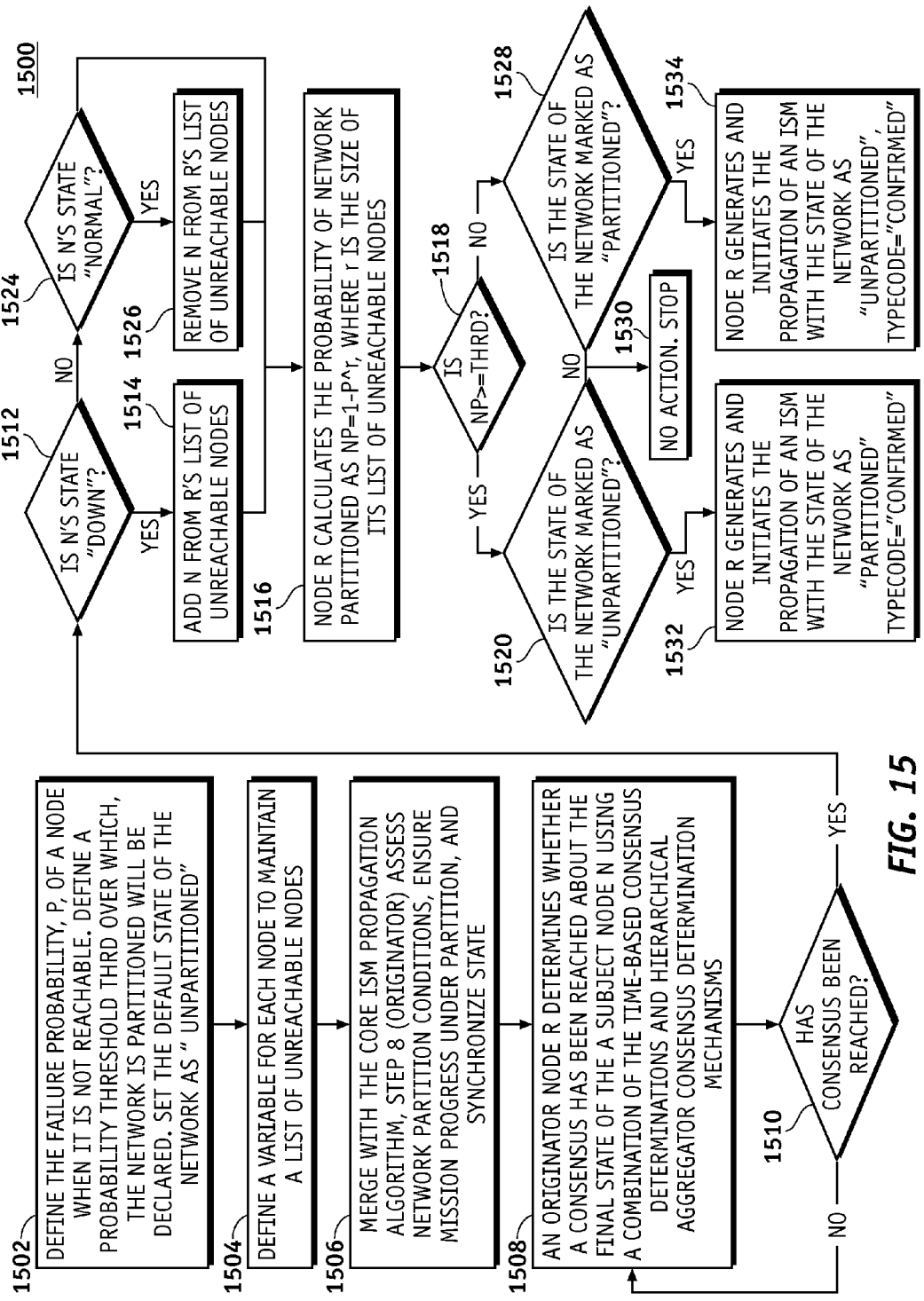
FIG. 15 is an illustration of an exemplary flowchart showing a partition detection process of the system of FIG. 6 according to an embodiment of the disclosure.

FIG. 15 is an illustration of an exemplary flowchart showing a partition detection process 1500 of the system 600 according to an embodiment of the disclosure. Process 1500 calculates the probability of a network being partitioned as an aggregate value of the probability of the nodes being normal, 1-P, when they are not reachable. For example, the probability of a network is partitioned is calculated as $1-P^r$, assuming each node has a uniform failure probability P and r is the number of nodes not reachable from a partition. (Extension to cases where each node j has an independent failure probability $P_j$ is straightforward.) As an example, suppose a group of connected nodes (a partition) detects that r=5 nodes in the system are no longer reachable and suppose P=5%, then the probability of some of the 5 nodes being normal and in separate partitions is near 1-5%*5%*5%*5%*5% which is almost 100%.

Process 1502 may begin by estimating the failure probability, P, of a node when it is not reachable. Define a probability threshold THRD over which, the network is considered partitioned. Set the default state of the network as "UNPARTITIONED" (task 1502).

Each node maintains a list of unreachable nodes (task 1504).

Continue on the ISM propagation process 700 task 730, (Originator) assess network partition conditions, ensure mission progress under partition, and synchronize state. An originator node R determines whether a consensus has been reached about the final state of a subject node N using a combination of the time-based consensus determination and hierarchical aggregator consensus Determination mechanisms (task 1508).

If consensus has been reached (Yes branch of inquiry task 1510) about the final state on subject node N, continue with the following sub-steps; otherwise wait until consensus has been reached (No branch of the inquiry task 1510).

Update the list of unreachable nodes: If N's final state is "DOWN" (inquiry task 1512), add N from R's list of unreachable nodes (task 1514). If N's final state is "NORMAL", remove N from R's list of unreachable nodes (task 1526).

Calculate the probability of network being partitioned: Node R calculates the probability of network partitioned as $NP=1-P^r$, where r is the size of its list of unreachable nodes (task 1516).

If NP>=THRD (inquiry task 1518), R checks whether the state is "UNPARTITIONED" in its record (inquiry task 1520). If no (i.e., it is already marked as "PARTITIONED"), no action and stop (task 1530). If yes, R generates and propagates an ISM with the state of the network as "PARTITIONED" and typeCode="CONFIRMED" (task 1532) to inform the list of nodes it may still reach that the network is partitioned. (The list of nodes it may still reach forms one partition. At least some of the unreachable nodes are in other partitions.)

Otherwise (NP<THRD), R checks whether the state is "PARTITIONED" in its record (inquiry task 1528). If no (i.e., it is already marked as "UNPARTITIONED"), no action and stop (task 1530). If yes, R generates and propagates an ISM with the state of the network as "UNPARTITIONED" and typeCode="CONFIRMED" (task 1534) to inform the list of nodes it may still reach that the network is no longer partitioned.

A combination of the partition detection module 614, the detection and synchronization module 616, make the system 600 autonomic in fault detection and self-healing.

Figure 16:
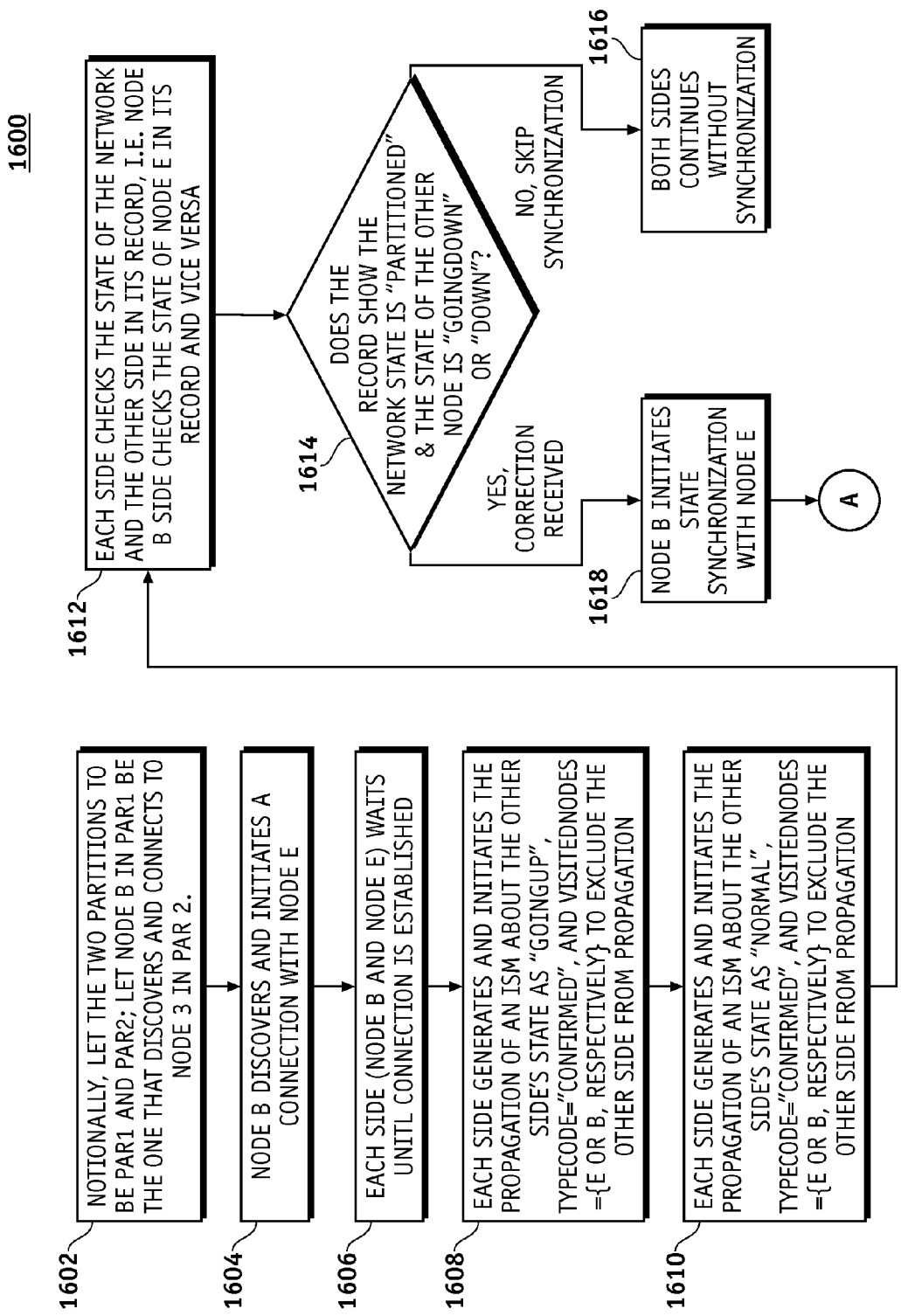
FIG. 16 is an illustration of an exemplary flowchart showing a partition recovery and synchronization process of the system of FIG. 6 according to an embodiment of the disclosure.
Figure 16:
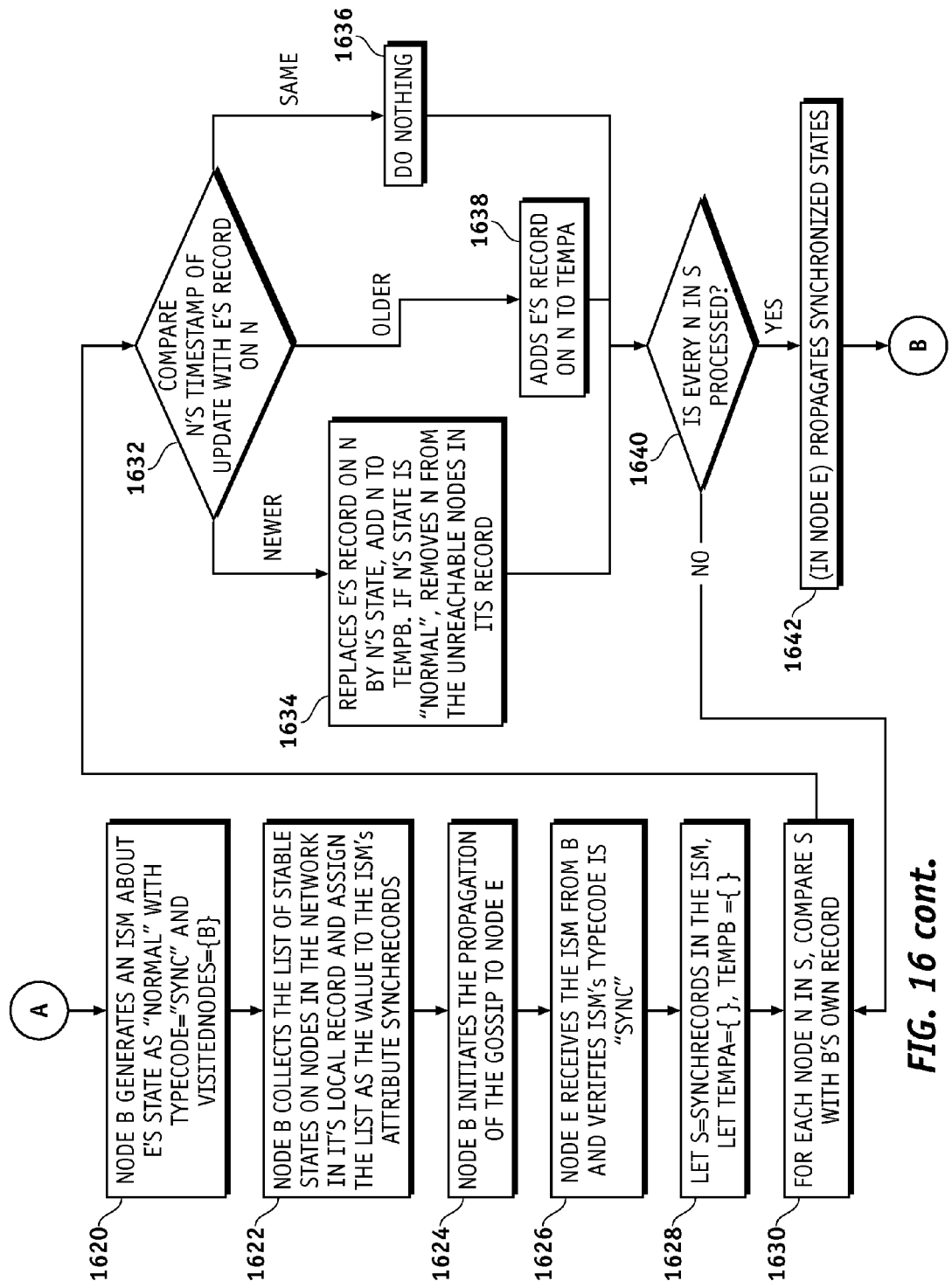
Figure 16:
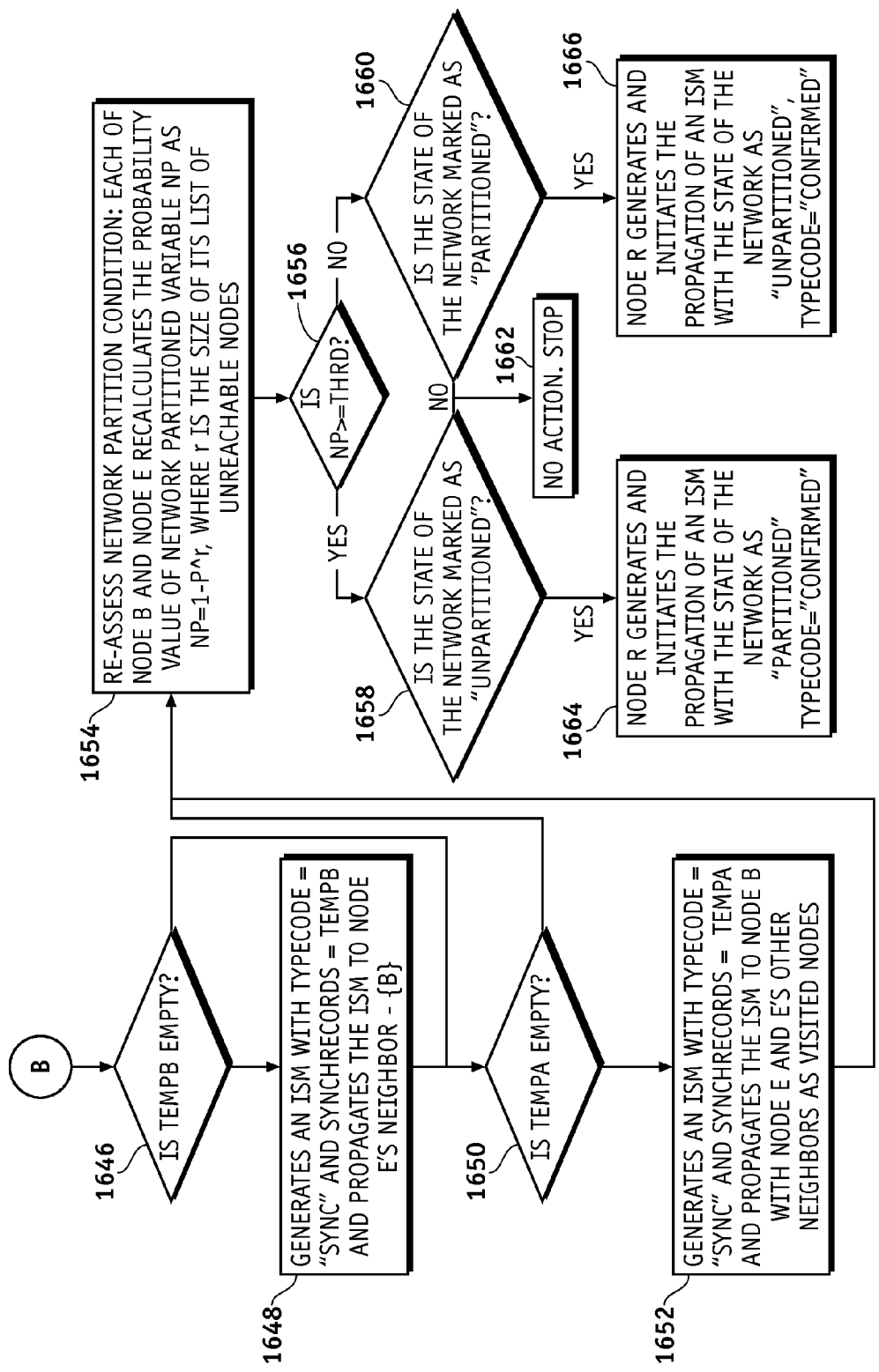

FIG. 16 is an illustration of an exemplary flowchart showing a partition recovery and synchronization process 1600 of the system 600 according to an embodiment of the disclosure. As discussed above, system 600 enables mission execution to continue making progress under network partitions. Mission execution in a biding-deciding-executing cycle continues within each partition utilizing resources in a partition. Our approach guarantees that a task is executed in one and only one partition. Because mission execution may proceed concurrently in multiple partitions, the state in one partition may be out of sync from the state in another partition. When two partitions rejoin, the states of them must be synchronized to continue the mission execution without any conflicts. FIG. 14 shows an example of a mission network that is partitioned and later the two partitions rejoin.

System 600 comprises automatic detection and recovery mechanisms for network partition scenarios. Above, a mechanism and algorithm for automatic detection of network partition was described. Under this mechanism, each node in a partition is aware of a list of nodes in the partition. Note that states among nodes in one partition are consistent.

The automatic recovery from a network partition and synchronizing states between two rejoining partitions is through the Partition Recovery and Synchronization process 1600, leveraging the ISM propagation protocol and algorithms to inform all nodes of state changes.

Preconditions of process 1600: Without loss of generality, let the two partitions be Par1 and Par2, let node B 104 in Par1 and node E 110 in Par 2 be the two nodes get connected through usual discovery and probing mechanisms (task 1602). While the process 1600 behaves in the same way whether node B 104 initiates a connection with node E 110 or the other way around, let node B 104 be the node that discovers and initiates a connection with node E 110. Also, the logic for each node is identical though different conditional logic may be invoked at different time depending on the values of the variables in a node. All nodes are concurrently executing the same algorithm.

Node B 104 in Par1 discovers and initiates a connection with node E 110 in Par2 (task 1604).

Each side (node B 104 and node E 110) waits until the connection between them is successfully established (task 1606).

Each side generates and initiates the propagation of an ISM about the other side's state as "GOINGUP" with typeCode="CONFIRMED" (task 1608).

Node B 104 side generates and initiates the propagation of an ISM about E 110's state as "GOINGUP" with typeCode="CONFIRMED" and visited Nodes={E 110}. (Node E 110 and other nodes in partition Par2 already know this state regarding E 110.)

Node E 110 side generates and initiates the propagation of an ISM about B 104's state as "GOINGUP" with typeCode="CONFIRMED" and visited Nodes={B 104}. (Node B 104 and other nodes in partition Par1 already know this state regarding B 104.)

Each side generates and initiates the propagation of an ISM about the other side's state as "NORMAL" with typeCode="CONFIRMED" (task 1610).

Node B 104 side generates and initiates the propagation of an ISM about E 110's state as "NORMAL" with typeCode="CONFIRMED" and visited Nodes={E 110}. (Node E 110 and other nodes in partition Par2 already know this state regarding E 110.)

Node E 110 side generates and initiates the propagation of an ISM about B 104's state as "NORMAL" with code="CONFIRMED" and visited Nodes={B 104}. Node B 104 and other nodes in partition Par1 already know this state regarding B.

Each side checks the state of the other side in its record (inquiry task 1614). Node B 104 side checks the state of node E 110 in its record and by the same logic, node E 110 side checks the state of node B 104 in its record (task 1612).

If the state on either side (node B 104 or node E) shows the network is "PARTITIONED" and the state of the other node (node E 110 or node B 104) is marked as "GOINGDOWN" or "DOWN" (which means the node is not in its partition), state synchronization between the two partitions is required (Yes branch of inquiry task 1614) and node B initiates the synchronization with node E (task 1618). Otherwise, both sides continues without synchronization (No branch of inquiry task 1614-task 1616).

State synchronization between the two partitions:

Node B 104 generates an ISM about E 110's state as "NORMAL" with typeCode="SYNC" and visitedNodes={B 104} (task 1620).

Node B 104 collects the list of stable states on nodes in the network in its local record (e.g., with "NORMAL" or "DOWN" values on the status of nodes in the network) and assign the list as the value to the ISM's attribute synchRecords (task 1622).

Node B 104 initiates the propagation of the ISM to node E 110 (task 1624).

Node E 110 receives the ISM from B 104 and verifies the ISM's typeCode as "SYNC" (task 1626).

Let s=synchRecords in the ISM, let tempA={ }, tempB 104={ } (task 1628).

For each node n in s, compares s with B 104's own record (inquiry task 1632): (a) if n has a newer timestamp of update than E 110's record on n, replaces E 110's record on n by n's state, adds n to tempB. If n's state is "NORMAL", removes n from the unreachable nodes in its record (task 1634); (b) if n has an older timestamp than E 110's record on n, adds E 110's record on n to tempA (task 1638); (c) otherwise, do nothing (task 1636).

If every N in S is processed (Yes branch of inquiry task 1640), propagate synchronized states in node E110 (task 1642), otherwise lead back to task 1630 (No branch of inquiry task 1640).

If tempB is not empty (No branch of inquiry task 1646), generates an ISM with typeCode="SYNC" and synchRecords=tempB and propagates the ISM to node E 110's neighbor-{B} (task 1648). (Exclude node B from the propagation since the newer states are from node B 104).

If tempA is not empty (No branch of inquiry task 1650), generates an ISM with typeCode="SYNC" and synchRecords=tempA and propagates the ISM to node B 104 with node E 110 and E 110's other neighbors as visited nodes (task 1652) (i.e., they excluded from propagation since they already have the latest state). In this case, node E 110 of partition Par2 has newer states than node B 104 of partition Par1. The roles of node E 110 and node B 104 are switched and thus node B 104 and other nodes in Par1 will be synchronized with the latest states from Par2 of node E 110.

Re-assess network partition condition (task 1654): upon synchronization, partitions Par1 and Par2 are synchronized into one partition and should have the same list of unreachable nodes in its record. Perform the same logic as in the network partition detection process 1500 task 1516 to calculate the probability of network being partitioned: Each of node B 104 and node E 110 recalculates the probability value of network partitioned variable NP as NP=$1-P^{\wedge r}$, where r is the size of its list of unreachable nodes (which should be reduced after the two partitioned rejoin).

If NP>=THRD (Yes branch of inquiry task 1656) (where THRD is a preset threshold), B 104 or E 110, respectively, checks whether the state is "UNPARTITIONED" (inquiry task 1658) in its record. If no (No branch of inquiry task 1658), no action and stop (task 1662). If yes, B 104 or E 110, respectively, generates and propagates an ISM with the state of the network as "PARTITIONED" and typeCode="CONFIRMED" (task 1664) to inform the list of nodes it may still reach that the network is partitioned. (The list of nodes it may still reach forms one partition. At least some of the unreachable nodes are in other partitions.)

Otherwise If (NP<THRD) (No branch of inquiry task 1656), B 104 or E 110, respectively, checks whether the state is "PARTITIONED" (inquiry task 1666) in its record. If no (No branch of inquiry task 1660), no action and stop (task 1662). If yes, B 104 or E 110, respectively, generates and propagates an ISM with the state of the network as "UNPARTITIONED" and typeCode="CONFIRMED" (task 1666) to inform the list of nodes it may still reach that the network is no longer partitioned.

In (Yes branch of inquiry task 1656), the Partition Recovery and Synchronization process 1600 detects reconnect events, determines whether it is a situation of two partitions rejoining, exchanges states across partitions to synchronize the latest states from each partition, and finally re-assesses network partition condition and informs the nodes in the network of the condition. Throughout the algorithm steps, a "SYNC" typeCode and a "syncRecords" attribute are used in ISM to indicate synchronization with the state information. The same ISM propagation protocol and algorithms are used for ISM propagation.

Together with other fault-tolerance features, the Partition Recovery and Synchronization process 1600 enables automated self-healing of a network of nodes and supports resiliency and continuity of mission execution under dynamic and adverse conditions.

Figure 17:
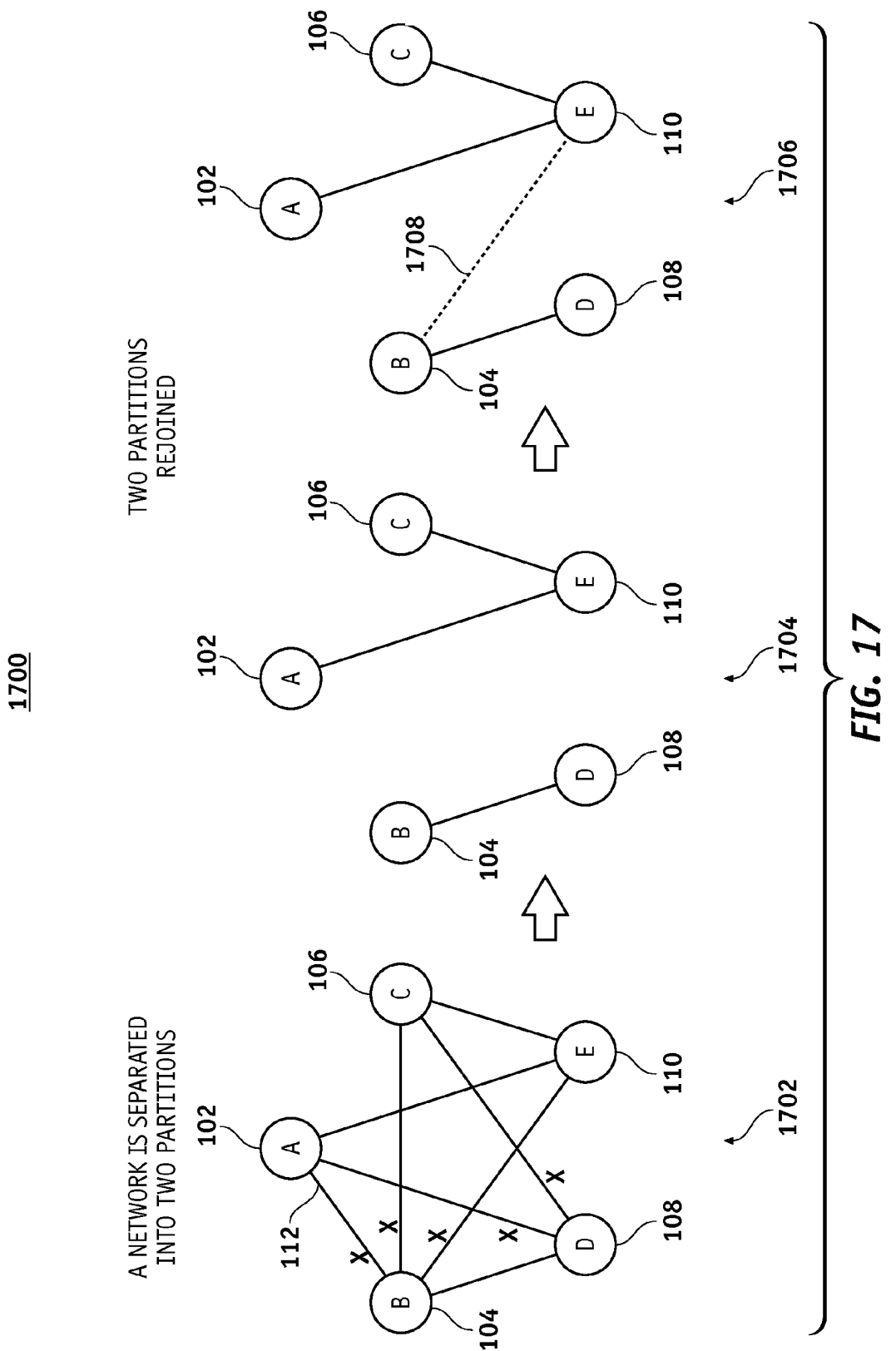
FIG. 17 is an illustration of an exemplary network showing partitioned and partitions rejoin according to an embodiment of the disclosure.

FIG. 17 is an illustration of an exemplary network showing partitioned and partitions rejoin according to an embodiment of the disclosure.

FIG. 18 is an illustration of an exemplary topology of a distributed and decentralized system according to an embodiment of the disclosure.

Consider an example, shown in 18, where Unit003's state about its neighbors is temporary out of sync with the actual state of its neighbors. The actual state of UAV001 is that it is no longer reachable from Unit003 (e.g., it is in a separate partition of Unit001-UAV001). However, Unit003 has not yet discovered that UAV001 is no longer its neighbor and its current state about UAV001 is normal (thus inconsistent with the actual state of UAV001). This is a temporary situation because Unit003 will eventually probe UAV001 and discover that UAV001 is no longer reachable and set its state to be consistent with the actual one, or it will receive an ISM from propagation indicating the actual state of UAV001. Before that, Unit003's knowledge about UAV001 is inconsistent with actual state of UAV001. During this temporary inconsistent period, our solution provides a fault-tolerant mechanism to recover from the consequences of inconsistency due to faults in communications.

To illustrate the mechanism, consider a scenario that Unit003 receives an ISM about Unit001 from Unit002. Given the state info in Unit003 about UAV001 (being normal and a reachable neighbor), Unit003 attempts to propagate the ISM to UAV001. But this will fail (UAV001 is actually not reachable). Without handling of this fault, the ISM will be dropped (neither propagated nor echoed) and the originator will not receive any feedback necessary to move forward to determine a veto or a consensus.

Mechanism to handle node failure during propagation is defined in the following steps:

Step 1: Calculate v as the neighboring nodes to propagate the ISM to;

Step 2: If v is empty (no more nodes to propagate the ISM to), echo a consent back to sender; otherwise (v is not empty), propagate the ISM to nodes in v and count the number of successful propagations to v. If the count is 0 (not reaching to anyone in v), echo a consent back to sender. (If count >0, that's the normal case and the propagation continues).

As shown in Step 2, a fault-aware logic to check whether a propagation attempt to a set of neighboring nodes is successful was inserted. If not successful (e.g., due to faults in communication that have yet reflected in changes in a node's list of neighbors), an echo action is taken to inform the sender of the ISM. This mechanism will prevent the message from being dropped under such fault conditions and resulting in no-progress in consensus building.

Based on this mechanism, a fault-tolerant task 724 of the ISM propagation process 700 is updated as follows:

The ISM propagation process 700 is designed to handle dynamic faults of nodes and communications during the propagation. Dynamic faults during propagation are those faults occur in a network after an ISM has been initiated for propagation and those faults occur in nodes immediately following receiving an ISM and before sending the ISM out to their neighbors. Indeed, such dynamic faults are typical multiple faults occurring in a short period of time since the ISM may convey an initial fault. This robust mechanism consists of two components—a fault-aware echo component and a timer-based safeguard component.

The fault-aware echo component for handling dynamic and multiple faults is to take into account of the number of branches to which an ISM has been successfully propagated. The failed node will result in a failure in transmission during propagation and thus a reduced count of the successful propagations during the forward propagation phase. When the ISM reaches the leaf nodes of the propagation spanning tree, the leaf nodes will echo back along their respective branches until it reaches the originator. The total count of the echoes received by the originator indicates the number of branches the ISM has traversed. When the echo count is equal to the count of the successful propagations and they both are greater than zero, it means the ISM has visited every node connected by the branches and a global consensus is reached. Here the global consensus is only regard to those nodes reachable by the spanning tree.

On the other hand, it may be the case that when a node fails after the forward propagation of an ISM passes through but before the backward echo returns, or the node fails after it receives the ISM but before it could propagate the ISM to its neighbors or echo (if it is a leaf node). In this case, the failure of the node breaks the propagation branch in the spanning tree before it sends the expected echo up along the sender chain to reach the ISM's originator. In this case, the consensus condition of comparing the number of branches of successful propagation and the number of branches that have echoed will not be met and result in a no-progress situation. Thus, a time-based component, in which a timer is used in an originator of an ISM to break the no-progress situation may be used. When the timer expires (i.e., the preset time window passed), but the consensus condition is not satisfied yet, the originator then may determine that additional faults have occurred during propagation and consensus may be declared.

Figure 19:
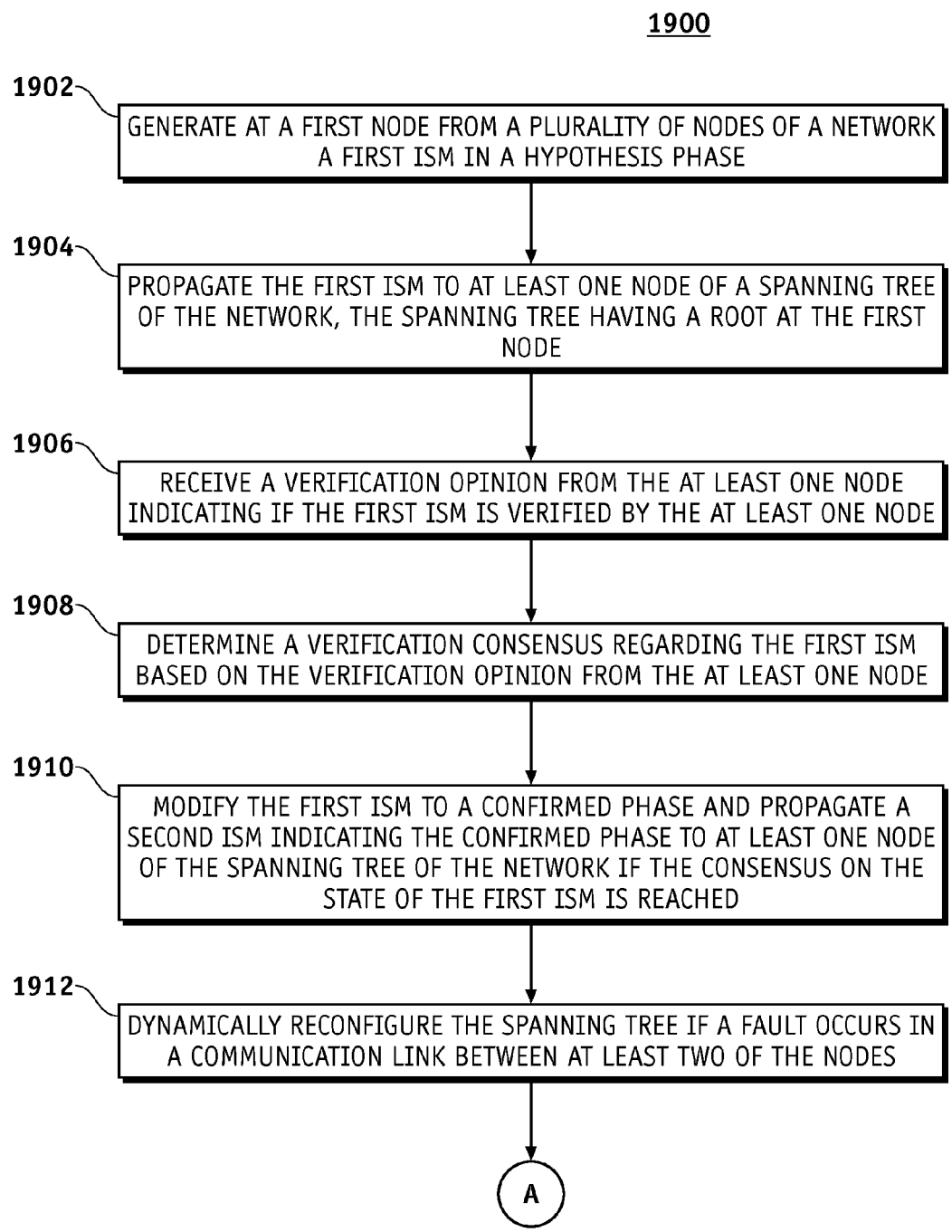
FIG. 19 is an illustration of an exemplary flowchart showing a process for information state sharing and consistency maintenance system under conditions of node failures and network partitions of the system of FIG. 6 according to an embodiment of the disclosure.
Figure 19:
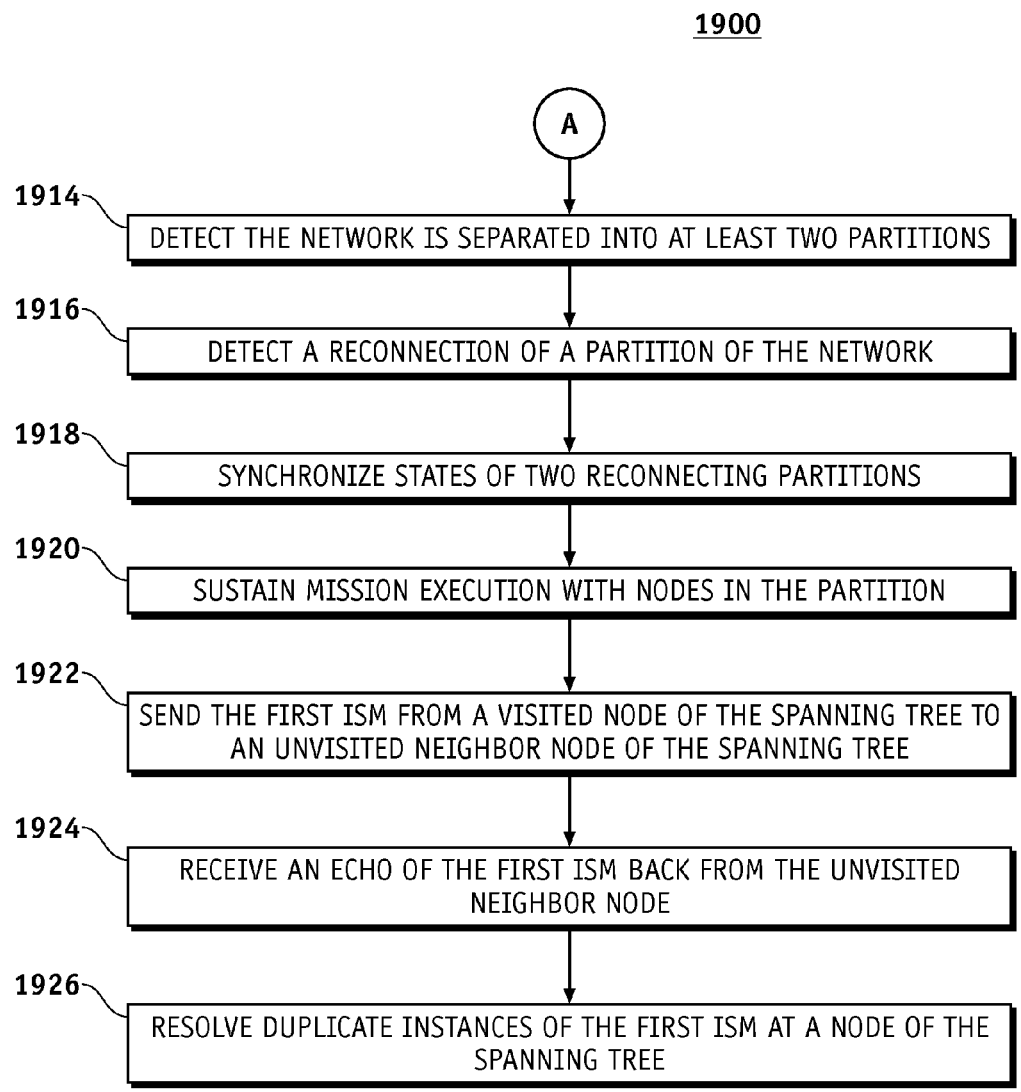

FIG. 19 is an illustration of an exemplary flowchart showing a process 1900 for an information state sharing and consistency maintenance under conditions of node failures and network partitions in a distributed and decentralized network of the system 600 according to an embodiment of the disclosure.

Process 1900 may begin by generating at a first node from nodes of a network a first information state message (ISM) in a hypothesis phase (task 1902). The ISM 204 at the first node is generated responsive to detection of an event or condition that should be shared with other nodes. A two-phase hypothesis/confirmation procedure and a two-value state mechanism <Transient-value, True-value> are designed to handle state uncertainty before consensus to overcome the limitations of local observations. The ISM 204 comprises a value representing the state 408 of the event or condition and a value indicating a hypothesis phase or a confirmed phase in the type code 416.

Process 1900 may continue by propagating the first ISM to at least one node of a spanning tree of the network, the spanning tree having a root at the first node (task 1904). The node comprises a plurality of responsibilities including receiving the ISM 204 and verifying the state value in an ISM 204 in the hypothesis phase based on local evidence, correcting the state value with a veto message to the ISM 204 sender if verification result is negative (i.e., local evidence contradicts with the state in the ISM 204), propagating the ISM 204 to unvisited nodes if verification result is not negative.

Process 1900 may continue by receiving a verification opinion from the at least one node indicating if a state in the first ISM is verified by the at least one node (task 1906). Verifying the ISM 204 by one or more of the nodes is based on local evidence available to the one or more nodes. For example, the verification opinion provided by the at least one node may indicate local evidence contradicts with a state of the first ISM.

Process 1900 may continue by determining a consensus regarding the state in the first ISM based on the verification opinion from the at least one node (task 1908). Determining the consensus regarding the ISM 204 is based on an estimated propagation time through the spanning tree, based on receiving the verification opinion from the nodes in the spanning tree, or a combination thereof.

Process 1900 may continue by modifying the first ISM to a confirmed phase and propagating a second ISM indicating the confirmed phase to at least one node of the spanning tree of the network if the consensus on the state of the first ISM is reached (task 1910). In this manner, task 1610 modifies the ISM 204 to a confirmed phase (i.e., assigning "CONFIRMED" to the typeCode 416 attribute) and achieves information state sharing through propagation of the ISM 204 to at least one node of a spanning tree of the network, the spanning tree having a root at the first node.

Process 1900 may continue by dynamically reconfiguring the spanning tree if a fault occurs in a communication link between at least two of the nodes (task 1912).

Process 1900 may continue by detecting the network is separated into at least two partitions (task 1914). One partition has no communication with another.

Process 1900 may continue by detecting a reconnection of a partition of the network (task 1916). One partition has restored communication with another.

Process 1900 may continue by synchronizing states of two (reconnecting) partitions (one partition with another) through exchanging and propagation of state updates when detecting a reconnection between them (task 1918). Either partition may have newer states for another. A synchronization method is provided to synchronize states of one partition with another.

Process 1900 may continue by sustaining mission execution with the nodes in the partition (task 1920) in a method that is globally conflict free.

Process 1900 may continue by sending the first ISM 204 from a visited node of the spanning tree to an unvisited neighbor node of the spanning tree (task 1922).

Process 1900 may continue by receiving an echo of the first ISM 204 back from the unvisited neighbor node (task 1924).

Process 1900 may continue by resolving duplicate instances of the first ISM message at a node of the spanning tree (task 1926).

Figure 20:
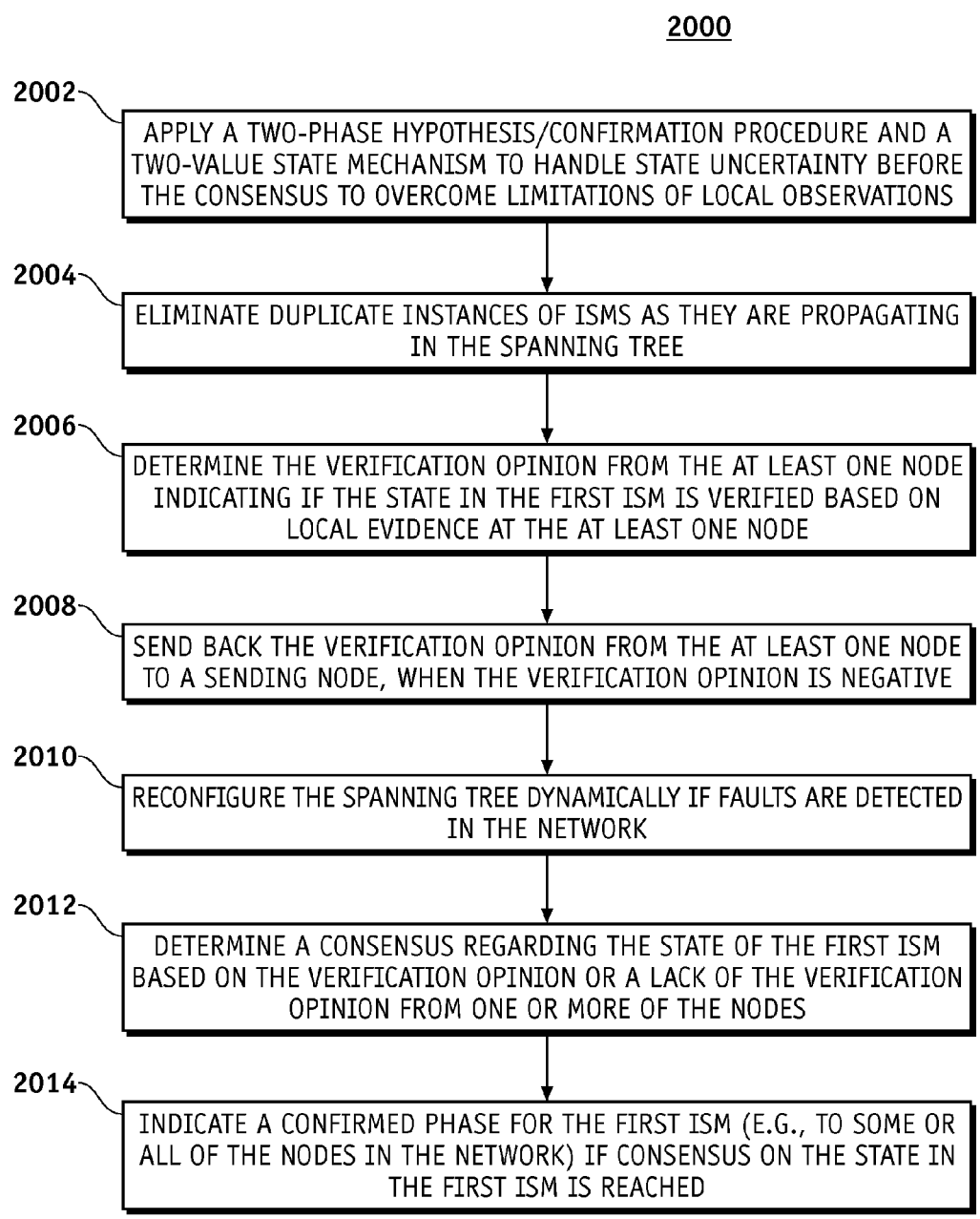
FIG. 20 is an illustration of an exemplary flowchart showing a process for an information state sharing and consistency maintenance system according to an embodiment of the disclosure.

FIG. 20 is an illustration of an exemplary flowchart showing a process 2000 for an information state sharing and consistency maintenance system according to an embodiment of the disclosure.

Process 2000 may begin by applying a two-phase hypothesis/confirmation procedure and a two-value state mechanism to handle state uncertainty before the consensus to overcome limitations of local observations (task 2002).

Process 2000 may continue by eliminating duplicate instances of the first ISM as they are propagating in the spanning tree (task 2004).

Process 2000 may continue by determining the verification opinion from the at least one node indicating if the state in the first ISM is verified based on local evidence at the at least one node (task 2006).

Process 2000 may continue by sending back the verification opinion from the at least one node to a sending node, when the verification opinion is negative (task 2008).

Process 2000 may continue by reconfiguring the spanning tree dynamically if faults are detected in the network (task 2010).

Process 2000 may continue by determining a consensus regarding the state of the first ISM based on the verification opinion or a lack of the verification opinion from one or more of the nodes (task 2012).

Process 2000 may continue by indicating a confirmed phase for the first ISM (e.g., to all the nodes in the network) if consensus on the state in the first ISM is reached (task 2014).

In this way, embodiments of the disclosure provide scalable, high performance, and fault-tolerant methods for achieving shared awareness through local observations and global state consistency in distributed and decentralized systems.

In this document, the terms "computer program product", "computer-readable medium", "computer readable storage medium", "non-transitory computer readable storage medium", and the like may be used generally to refer to media such as, for example, memory, storage devices, or storage unit. These and other forms of computer-readable media may be involved in storing one or more instructions for use by the processor module 628 to cause the processor module 628 to perform specified operations. Such instructions, generally referred to as "computer program code" or "program code" (which may be grouped in the form of computer programs or other groupings), when executed, enable power utilization scheduling methods of the system 600.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 6 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:
1. A method, comprising:
generating at a first node from a plurality of nodes of a network a first information state message (ISM) in a hypothesis phase, wherein the first node comprises a memory module that includes one or more storage devices and a processor module comprising one or more processors;
propagating the first ISM to at least one node of a spanning tree of the network, the spanning tree having a root at the first node, wherein propagating the first ISM comprises eliminating duplicate instances of the first ISM propagated in the spanning tree;
reconfiguring the spanning tree dynamically if faults are detected in the network;
receiving a verification opinion from the at least one node indicating if a state in the first ISM is verified by the at least one node based on local evidence at the at least one node;
sending the verification opinion from the at least one node back to a sending node, when the verification opinion is negative;
applying a two-phase hypothesis/confirmation procedure and a two-value state mechanism to handle state uncertainty before a consensus regarding the state in the first ISM is determined;
determining the consensus regarding the state in the first ISM based on the verification opinion or a lack of the verification opinion from the at least one node;
indicating a confirmed phase for the first ISM if consensus on the state in the first ISM is reached;
modifying the first ISM to the confirmed phase after the consensus on the state of the first ISM is reached;
determining a node-failure probability of a node of the plurality of nodes having failed when the node is unreachable;
after reaching the consensus on the state of the first ISM, determining a number of nodes that are unreachable based on the state of the first ISM;
determining a network-partition probability that the network is partitioned based on the node-failure probability and the number of nodes that are unreachable;
determining whether the network-partition probability exceeds a probability threshold value;
after determining that the network-partition probability exceeds the probability threshold, sending a second ISM indicating that the network is partitioned;
after sending the second ISM indicating that the network is partitioned, detecting a reconnection of a partition of the network; and
after detecting the reconnection, synchronizing states of the network through exchanging and propagation of state updates.

2. The method of claim 1, wherein the local evidence comprises one or more states related to an environment external to the at least one node.

3. The method of claim 1, wherein the two-value state mechanism comprises a transient-value and a true-value.

4. The method of claim 1, wherein generating the first ISM at the first node is responsive to detection of an event or condition and the state of the event or condition is encapsulated in the first ISM.

5. The method of claim 1, wherein the at least one node of the spanning tree of the network comprises a plurality of network nodes, and one or more of the network nodes verify the state in the first ISM.

6. The method of claim 5, wherein the verification opinion is based on local evidence available to the one or more of the network nodes.

7. The method of claim 1, wherein determining the consensus regarding the first ISM is based on a plurality of algorithms.

8. The method of claim 1, wherein determining the consensus regarding the first ISM is based on an estimated propagation time through the spanning tree, based on receiving the verification opinion from the nodes in the spanning tree, or a combination thereof.

9. The method of claim 1, wherein the first ISM is associated with one or more attributes, and wherein the one or more attributes comprise at least one of: a timestamp attribute, an originator attribute, a subject attribute, and a type-code attribute.

10. The method of claim 1, further comprising:
sustaining mission execution with nodes in the partition.

11. The method of claim 1, wherein propagating the first ISM further comprises:
sending the first ISM from a visited neighbor node of the spanning tree to an unvisited neighbor node of the spanning tree; and
receiving an echo of the first ISM back from the unvisited neighbor node.

12. The method of claim 11, wherein determining the consensus regarding the state in the first ISM is additionally based on a count of echoes received at the first node.

13. The method of claim 1, further comprising resolving duplicate instances of the first ISM at a node of the spanning tree.

14. The method of claim 1, wherein the first ISM comprises a value indicating the hypothesis phase or a confirmed phase based on a two-phase hypothesis/confirmation procedure and a two-value state mechanism.

15. The method of claim 14, wherein the two-value state mechanism comprises a transient-value and a true-value.

16. A system, comprising:
a network comprising a first node, wherein the first node comprises:
one or more storage devices configured to store at least computer-executable instructions;
one or more processors that are configured to, upon execution of the computer-executable instructions, cause the first node to carry out functions, the functions comprising:
generating a first information state message (ISM) in a hypothesis phase;
propagating the first ISM to at least one node of a spanning tree of the network, the spanning tree having a root at the first node, wherein propagating the first ISM comprises eliminating duplicate instances of the first ISM propagated in the spanning tree;
reconfiguring the spanning tree dynamically if faults are detected in the network;
receiving a verification opinion indicating if a state in the first ISM is verified by the at least one node based on local evidence at the at least one node;
sending the verification opinion from the at least one node back to a sending node, when the verification opinion is negative;
applying a two-phase hypothesis/confirmation procedure and a two-value state mechanism to handle state uncertainty before a consensus regarding the state in the first ISM is determined;
determining the consensus regarding the state in the first ISM based on the verification opinion or a lack of the verification opinion from the at least one node;
indicating a confirmed phase for the first ISM if consensus on the state in the first ISM is reached;
modifying the first ISM to the confirmed phase after the consensus on the state of the first ISM is reached;
determining a node-failure probability of a node of the plurality of nodes having failed when the node is unreachable, after reaching the consensus on the state of the first ISM, determining a number of nodes that are unreachable based on the state of the first ISM, determining a network-partition probability that the network is partitioned based on the node-failure probability and the number of nodes that are unreachable, determining whether the network-partition probability exceeds a probability threshold value, and after determining that the network-partition probability exceeds the probability threshold, sending a second ISM indicating that the network is partitioned;

after sending the second ISM indicating that the network is partitioned, detecting a reconnection of a partition of the network; and after detecting the reconnection, synchronizing states of the network through exchanging and propagation of state updates.

17. The system of claim 16, wherein the local evidence comprises one or more states related to an environment external to the at least one node.

18. The system of claim 16, wherein generating the first ISM at the first node is responsive to detection of an event or condition such that a state of the event or condition is encapsulated in the ISM.

19. The system of claim 16, wherein the at least one node comprises a plurality of network nodes, and one or more network nodes of the plurality of network nodes verify the state in the first ISM.

20. The system of claim 19, wherein the verification opinion is based on local evidence available to the one or more nodes.

21. The system of claim 19, wherein determining the consensus regarding the state of the first ISM comprises determining the consensus regarding the state of the first ISM based on an estimated propagation time through the spanning tree.

22. The system of claim 21, wherein determining the consensus regarding the state of the first ISM is based on receiving the verification opinion before expiration of the estimated propagation time.

23. The system of claim 19, wherein reconfiguring the spanning tree dynamically if faults are detected in the network comprises dynamically reconfiguring the spanning tree if a fault occurs in a communication link between at least two of the nodes.

24. The system of claim 19, wherein the functions further comprise:

sustaining mission execution with nodes in the partition.

25. The system of claim 16, wherein propagating the first ISM comprises:

sending the first ISM from a visited neighbor node of the spanning tree to an unvisited neighbor node of the spanning tree; and receiving an echo of the first ISM back from the unvisited neighbor node.

26. The system of claim 25, wherein determining whether the consensus regarding the state in the first ISM was reached is based on a count of echoes received at the first node.

27. The system of claim 16, wherein the functions further comprise resolving the duplicate ISM instances at a node of the spanning tree.

28. The system of claim 16, wherein the ISM comprises a value indicating a hypothesis phase or a confirmed phase based on the two-phase hypothesis/confirmation procedure and two-value state mechanism.

29. The system of claim 28, wherein the two-value state mechanism comprises a transient-value and a true-value.

30. A non-transitory computer readable storage medium storing computer-executable instructions that, upon execution by a processor of a first node of a network, cause the first node to carry out functions comprising:

generating a first information state message (ISM) in a hypothesis phase;

propagating the first ISM to at least one node of a spanning tree of the network, the spanning tree having a root at the first node, wherein propagating the first ISM comprises eliminating duplicate instances of the first ISM propagated in the spanning tree;

reconfiguring the spanning tree dynamically if faults are detected in the network;

receiving a verification opinion from the at least one node indicating if a state in the first ISM is verified by the at least one node based on local evidence at the at least one node;

sending the verification opinion from the at least one node back to a sending node, when the verification opinion is negative;

applying a two-phase hypothesis/confirmation procedure and a two-value state mechanism to handle state uncertainty before a consensus regarding the state in the first ISM is determined;

determining the consensus regarding the state in the first ISM based on the verification opinion or a lack of the verification opinion from the at least one node;

indicating a confirmed phase for the first ISM if consensus on the state in the first ISM is reached;

modifying the first ISM to the confirmed phase;

determining a node-failure probability of a node of the plurality of nodes having failed when the node is unreachable;

after reaching the consensus on the state of the first ISM, determining a number of nodes that are unreachable based on the state of the first ISM;

determining a network-partition probability that the network is partitioned based on the node-failure probability and the number of nodes that are unreachable;

determining whether the network-partition probability exceeds a probability threshold value; and after determining that the network-partition probability exceeds the probability threshold, sending a second ISM indicating that the network is partitioned;

after sending the second ISM indicating that the network is partitioned, detecting a reconnection of a partition of the network; and after detecting the reconnection, synchronizing states of the network through exchanging and propagation of state updates.

* * * * *